United States Patent [19]

Nickolls et al.

[11] Patent Number: 5,243,699
[45] Date of Patent: Sep. 7, 1993

[54] INPUT/OUTPUT SYSTEM FOR PARALLEL PROCESSING ARRAYS

[75] Inventors: John R. Nickolls, Los Altos; Won S. Kim, Fremont; John Zapisek, Cupertino; William T. Blank, Palo Alto, all of Calif.

[73] Assignee: MasPar Computer Corporation, Sunnyvale, Calif.

[21] Appl. No.: 802,944

[22] Filed: Dec. 6, 1991

[51] Int. Cl.⁵ .................... G06F 15/16; G06F 15/80
[52] U.S. Cl. .................... 395/275; 395/800; 364/DIG. 1
[58] Field of Search .............. 370/60, 94.3, 60.1; 340/825.52; 395/275, 800

[56] References Cited

U.S. PATENT DOCUMENTS

| | | | |
|---|---|---|---|
| 4,623,996 | 11/1986 | McMillen | 370/60 |
| 4,644,346 | 2/1987 | Ito et al. | 340/825.03 |
| 4,862,451 | 8/1989 | Closs et al. | 340/60 |
| 4,876,644 | 10/1989 | Nuechterlein et al. | 395/800 |
| 5,008,815 | 4/1991 | Hillis | 395/800 |
| 5,093,827 | 3/1992 | Franklin et al. | 370/60.1 |

FOREIGN PATENT DOCUMENTS

WO88/06764 9/1988 PCT Int'l Appl.

*Primary Examiner*—Dale M. Shaw
*Assistant Examiner*—Lance Leonard Barry
*Attorney, Agent, or Firm*—Skjerven, Morrill, MacPherson, Franklin & Friel

[57] ABSTRACT

A massively parallel processor includes an array of processor elements (20), of PEs, and a multi-stage router interconnection network (30), which is used both for I/O communications and for PE to PE communications. The I/O system (10) for the massively parallel processor is based on a globally shared addressable I/O RAM buffer memory (50) that has address and data buses (52) to the I/O devices (80, 82) and other address and data buses (42) which are coupled to a router I/O element array (40). The router I/O element array is in turn coupled to the router ports (e.g. S2_0_X0) of the second stage (430) of the router interconnection network. The router I/O array provides the corner turn conversion between the massive array of router lines (32) and the relatively few buses (52) to the I/O devices.

22 Claims, 15 Drawing Sheets

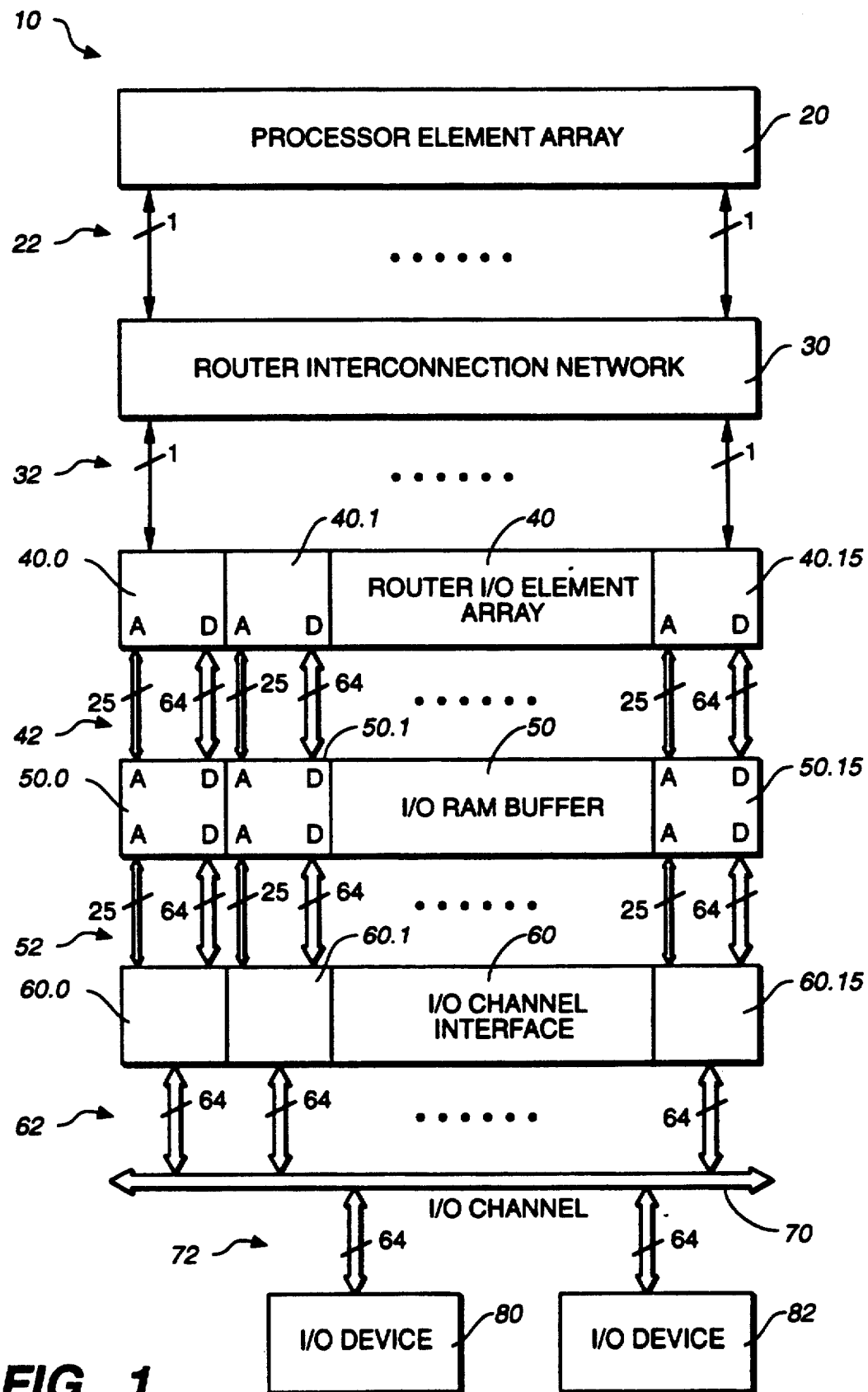
FIG._1

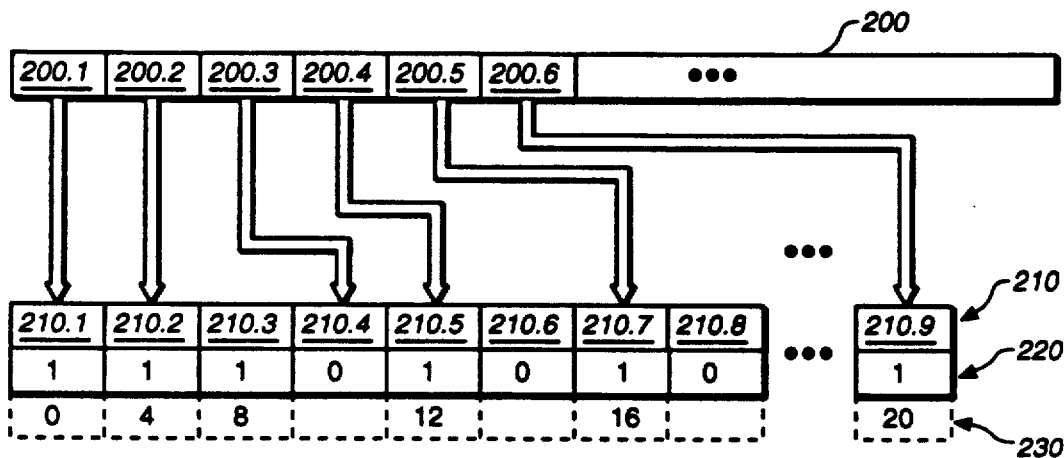
FIG._2
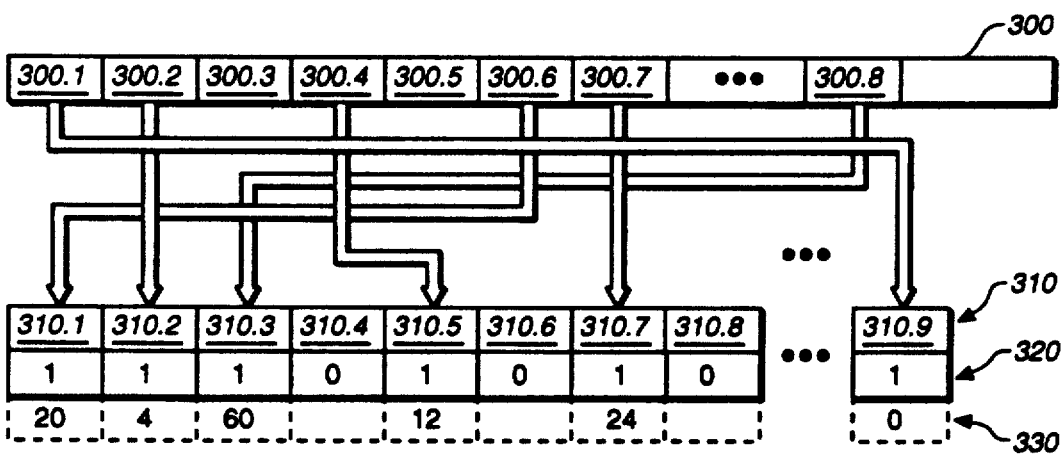
FIG._3

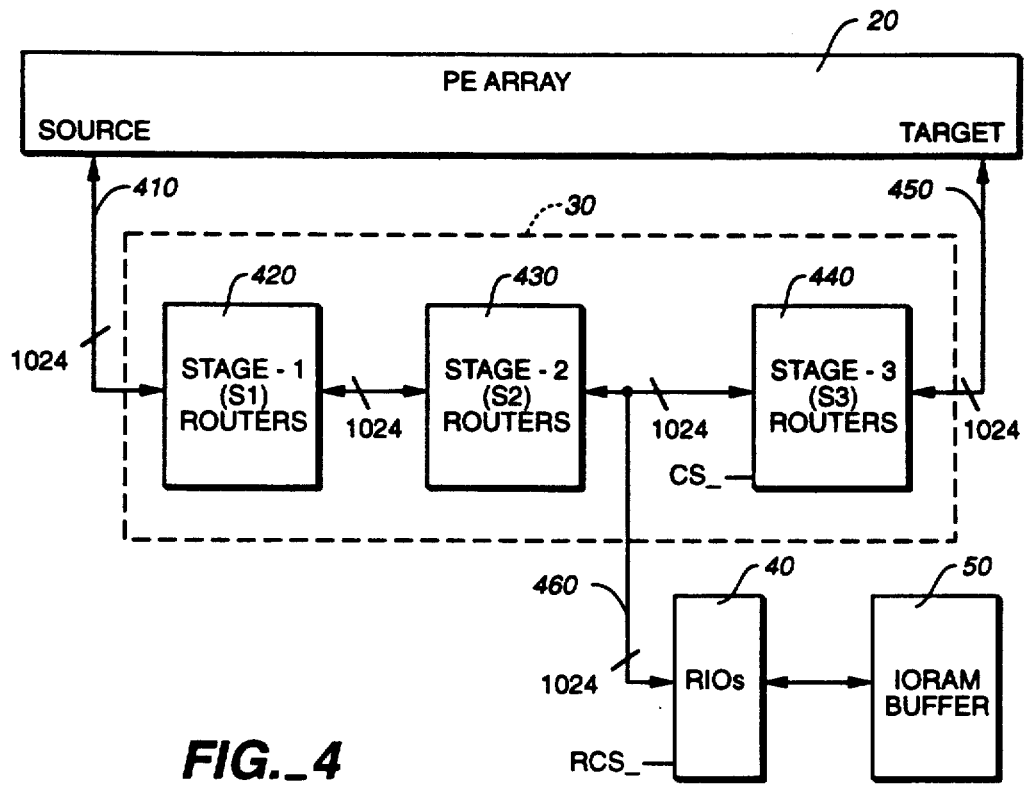
FIG._4
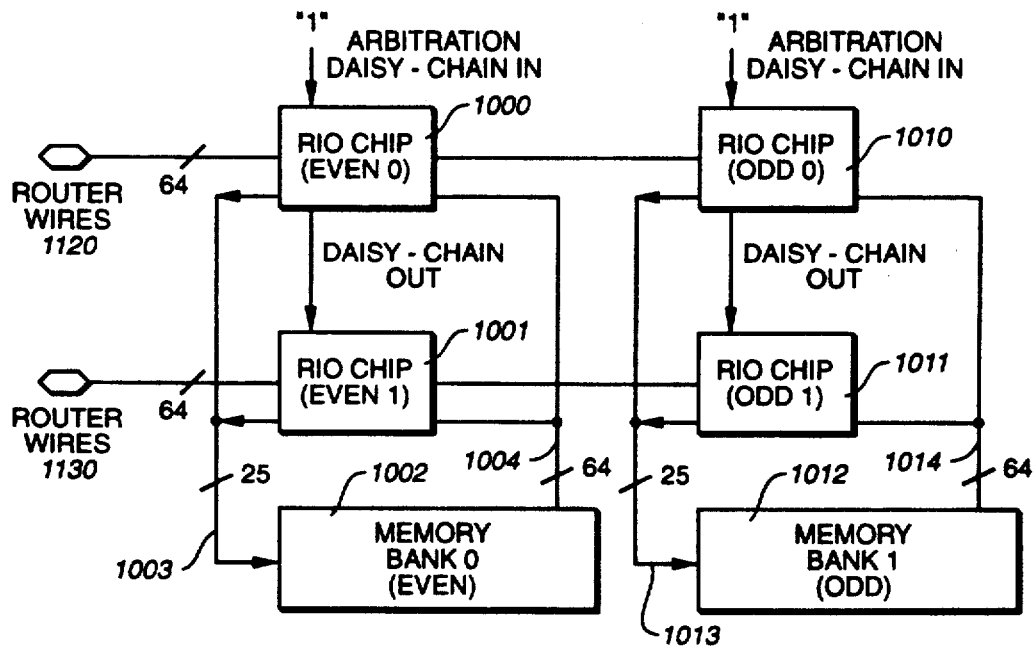
FIG._11

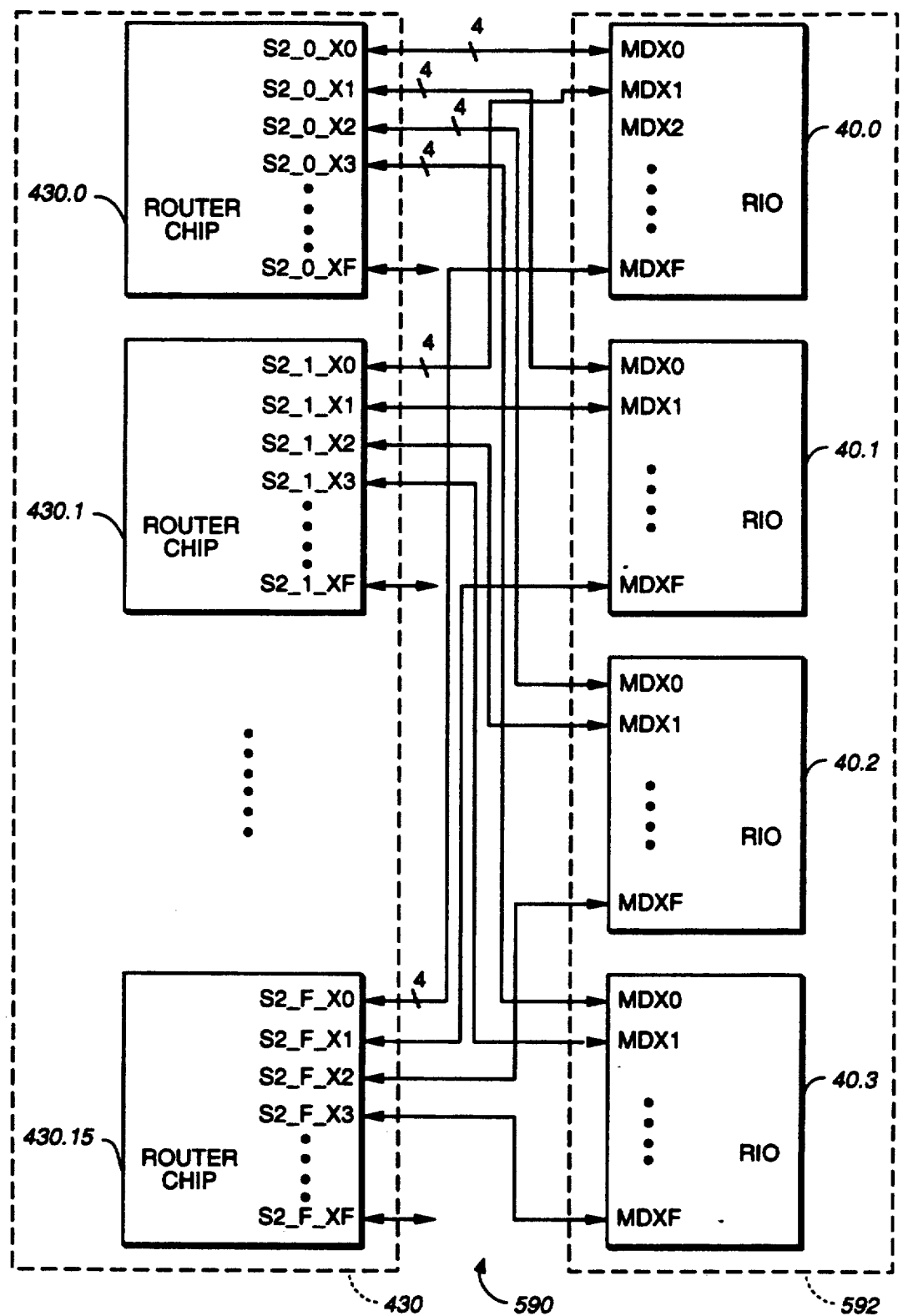
FIG._5

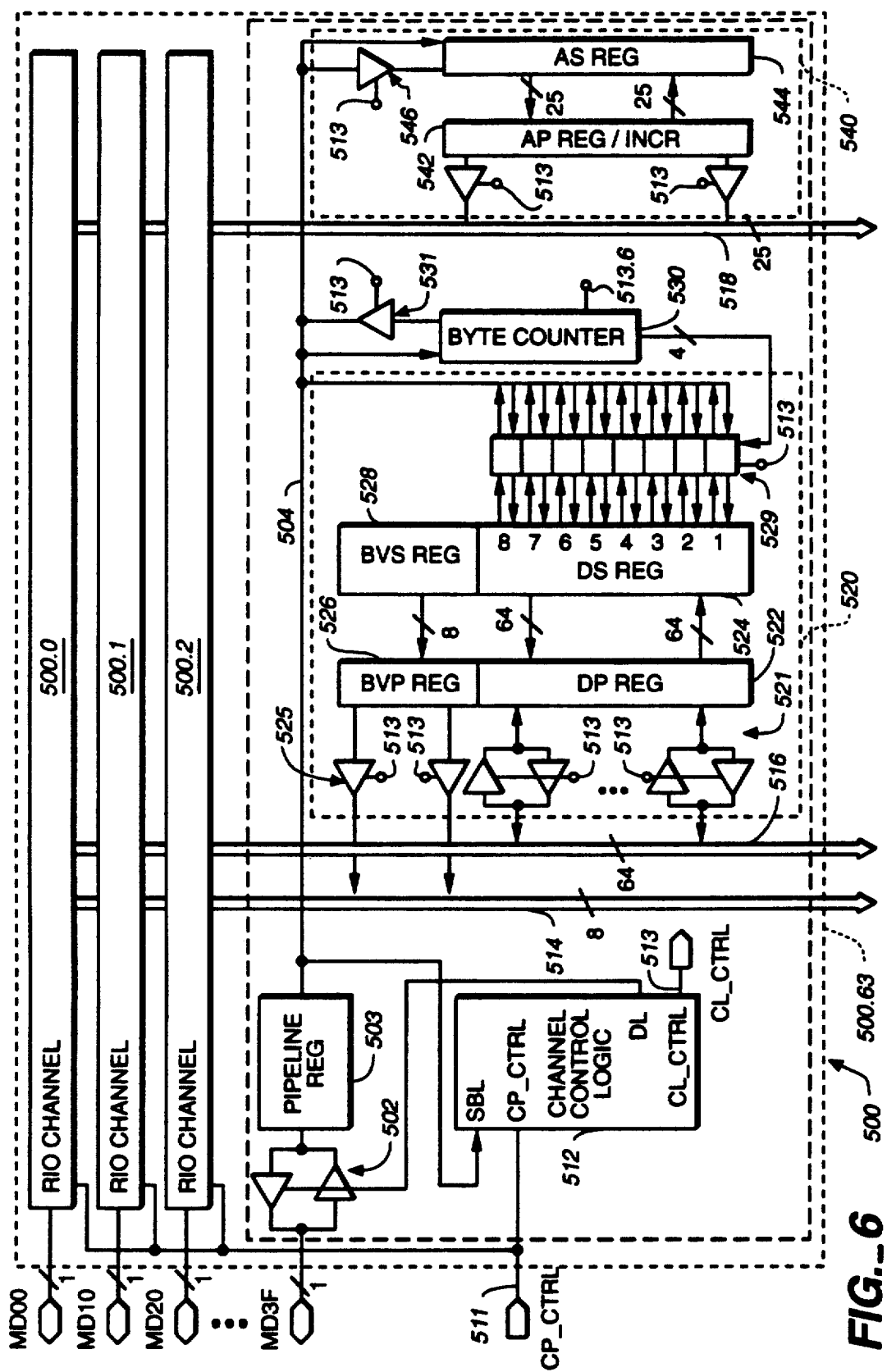
FIG._6

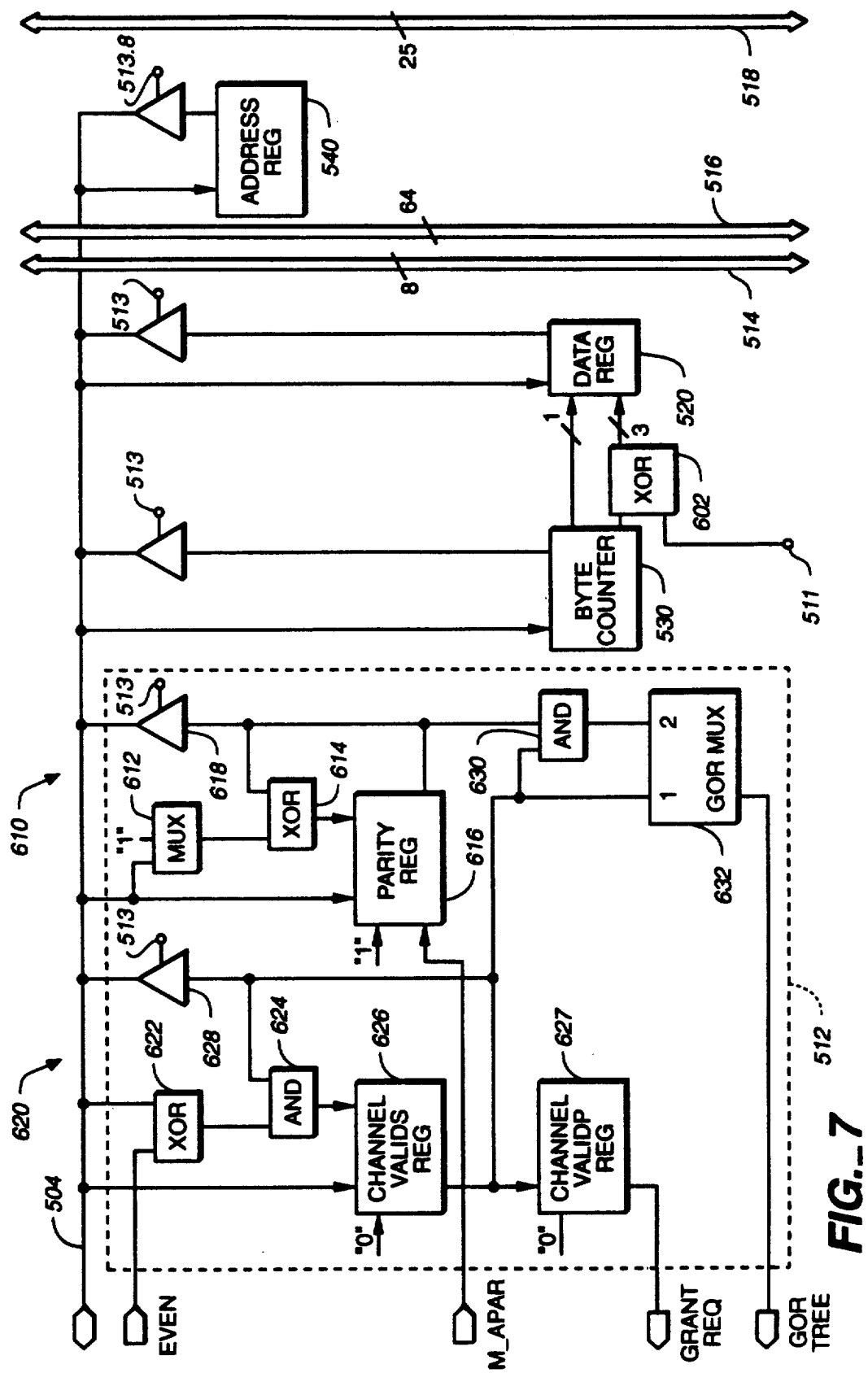
FIG._7

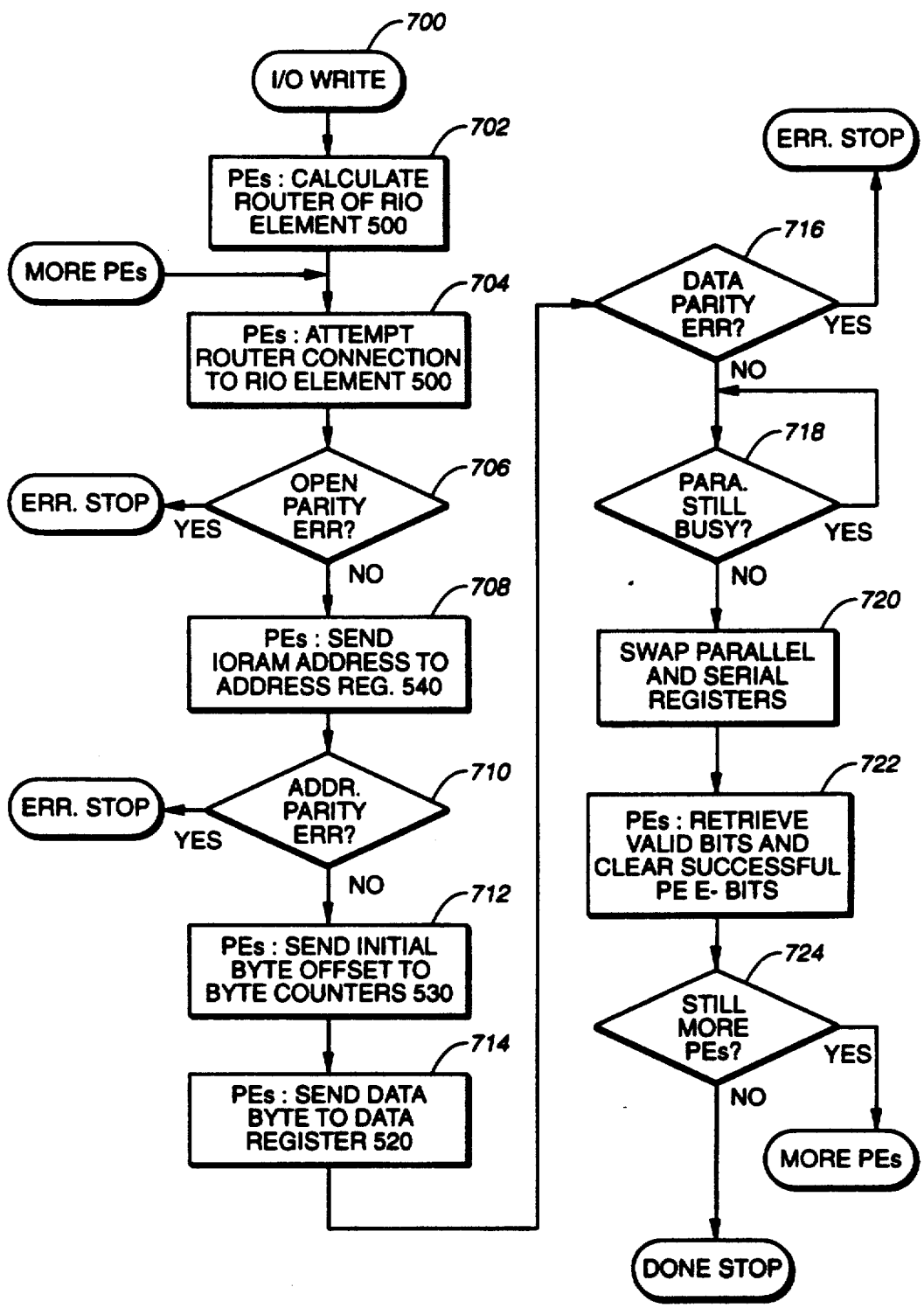
FIG._8

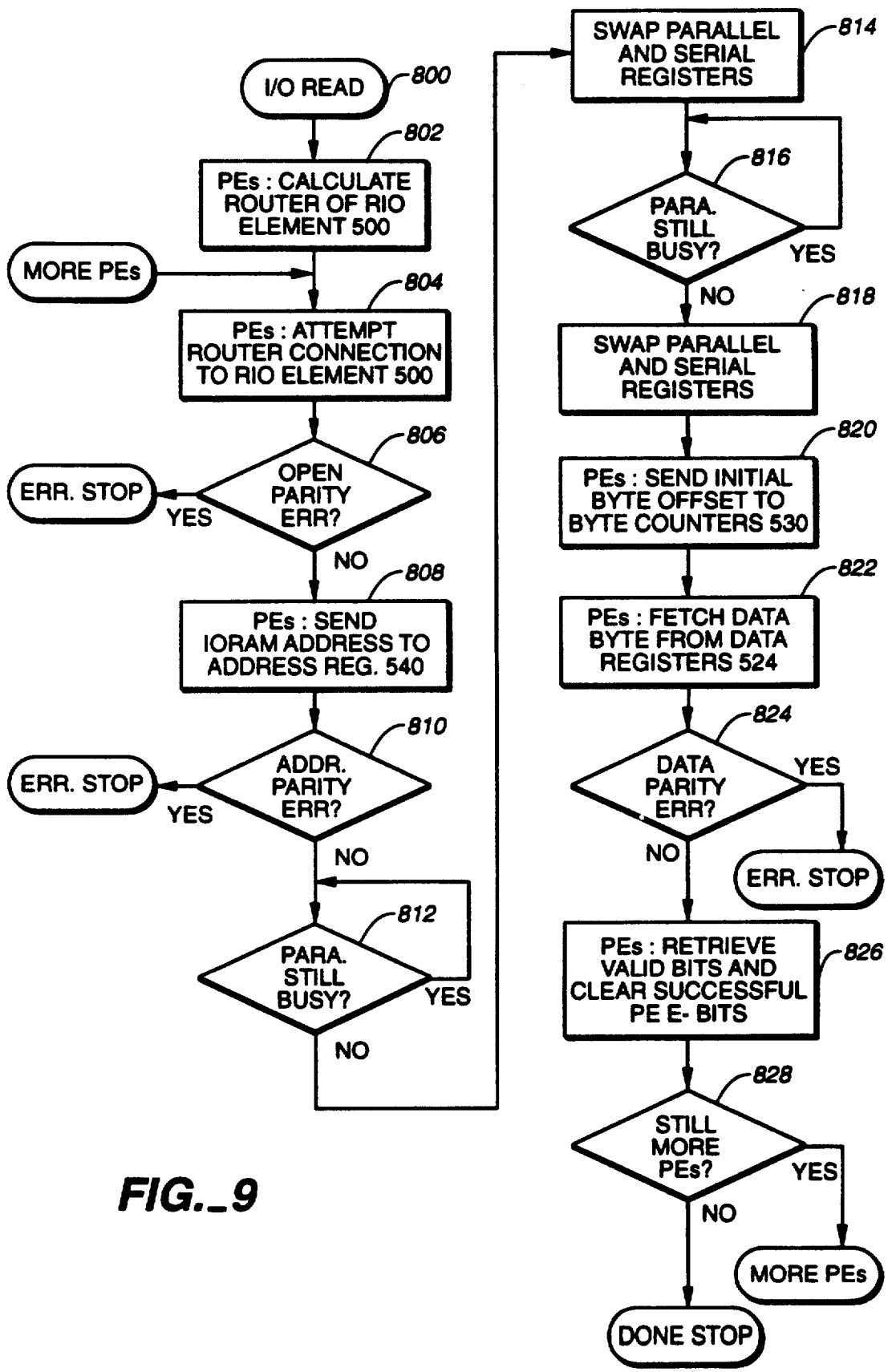
FIG._9

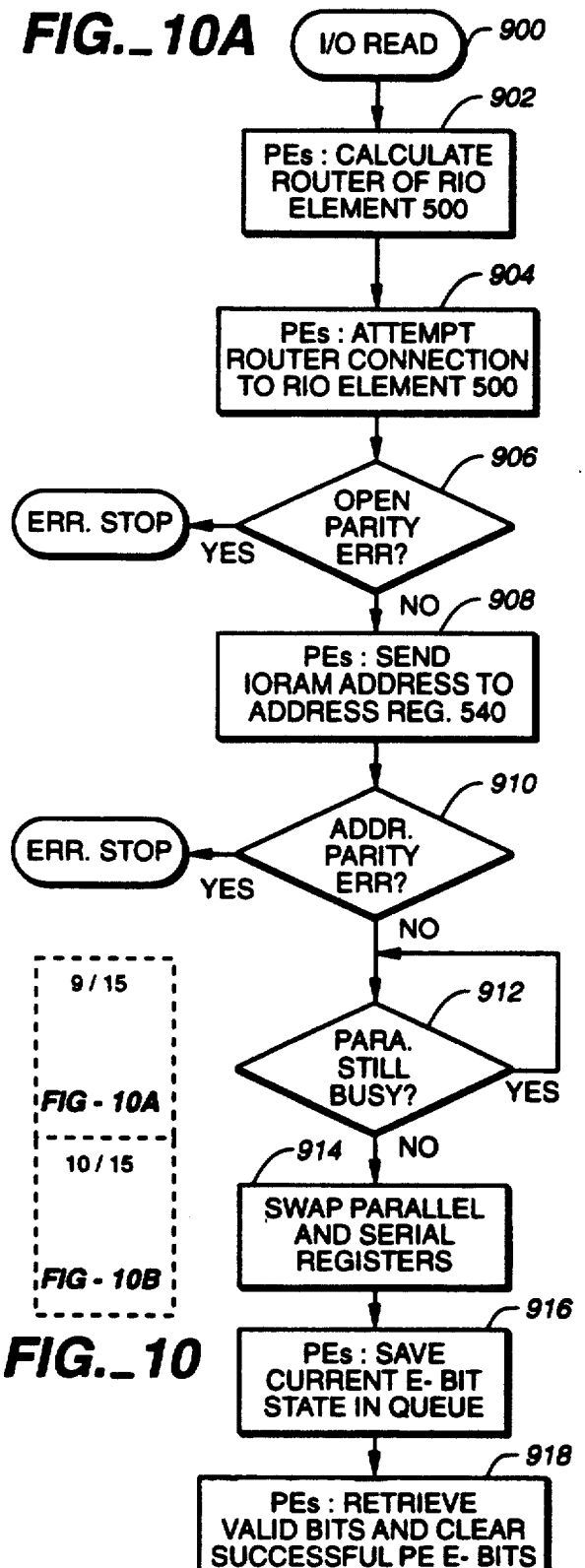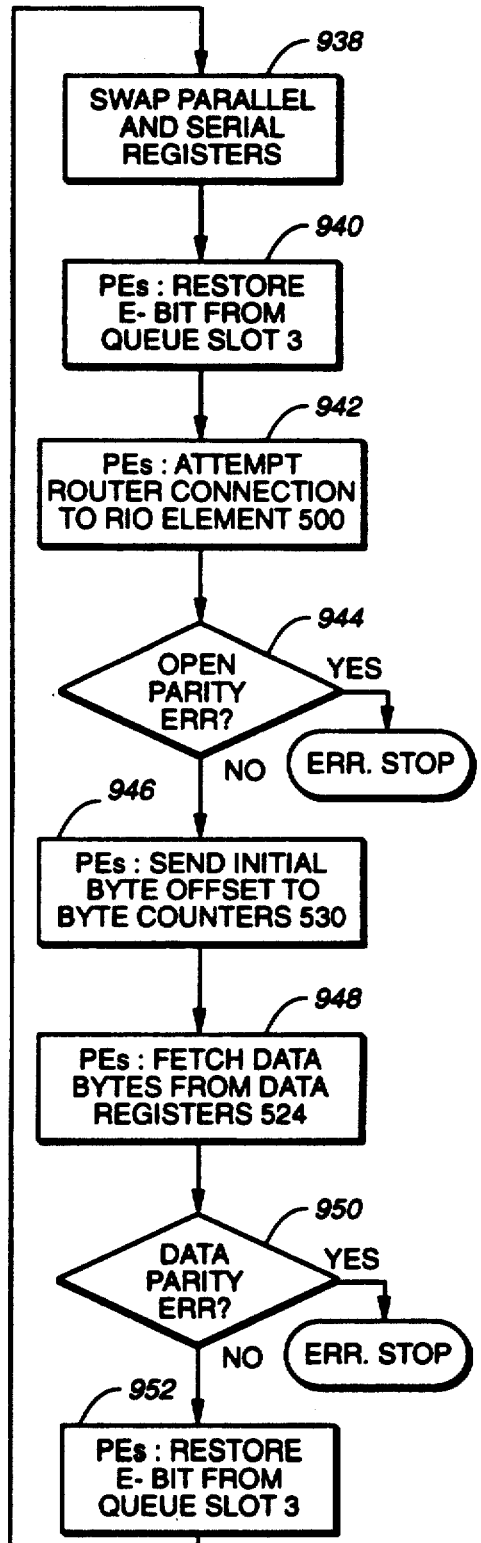

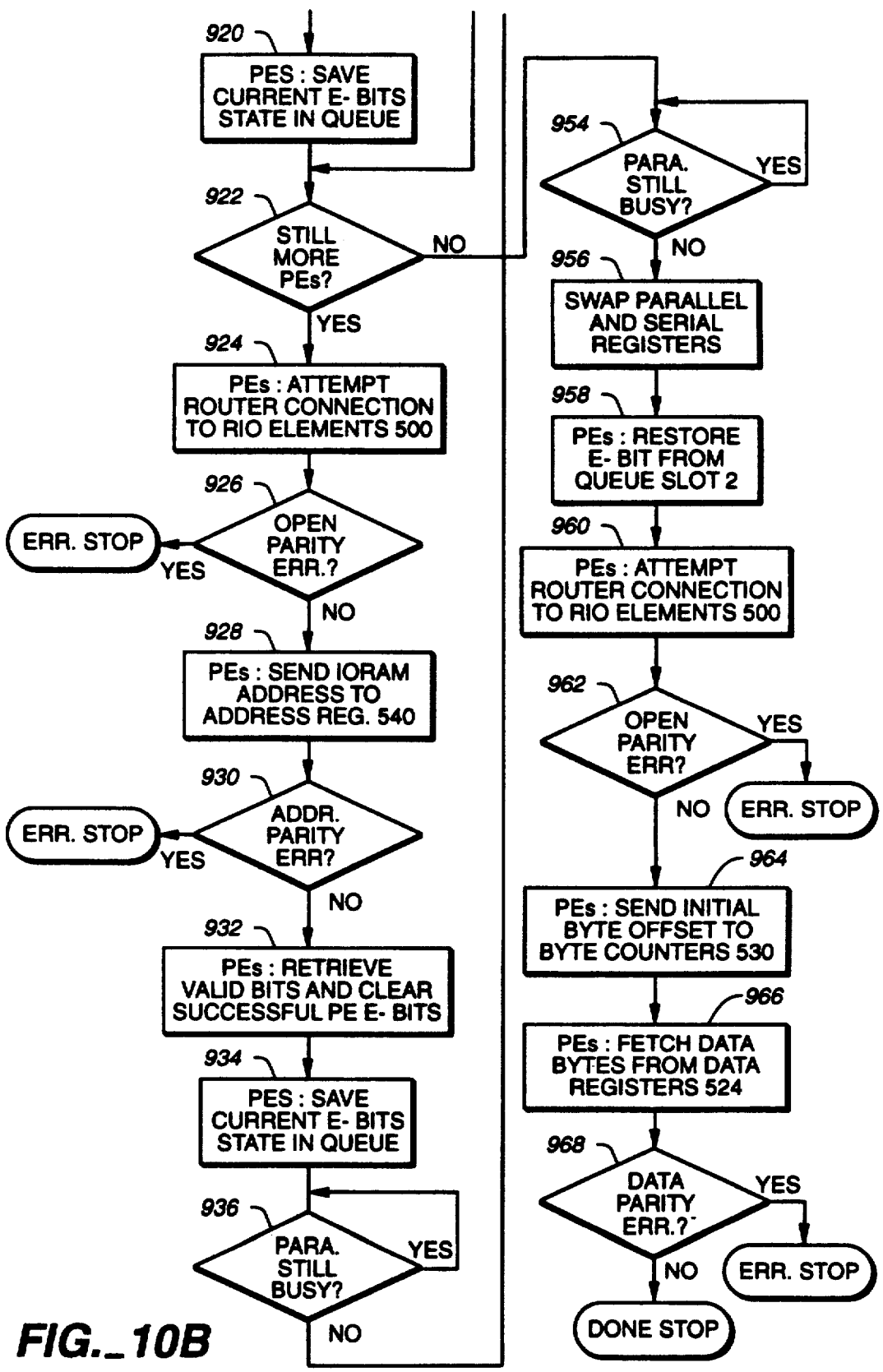
FIG._10B

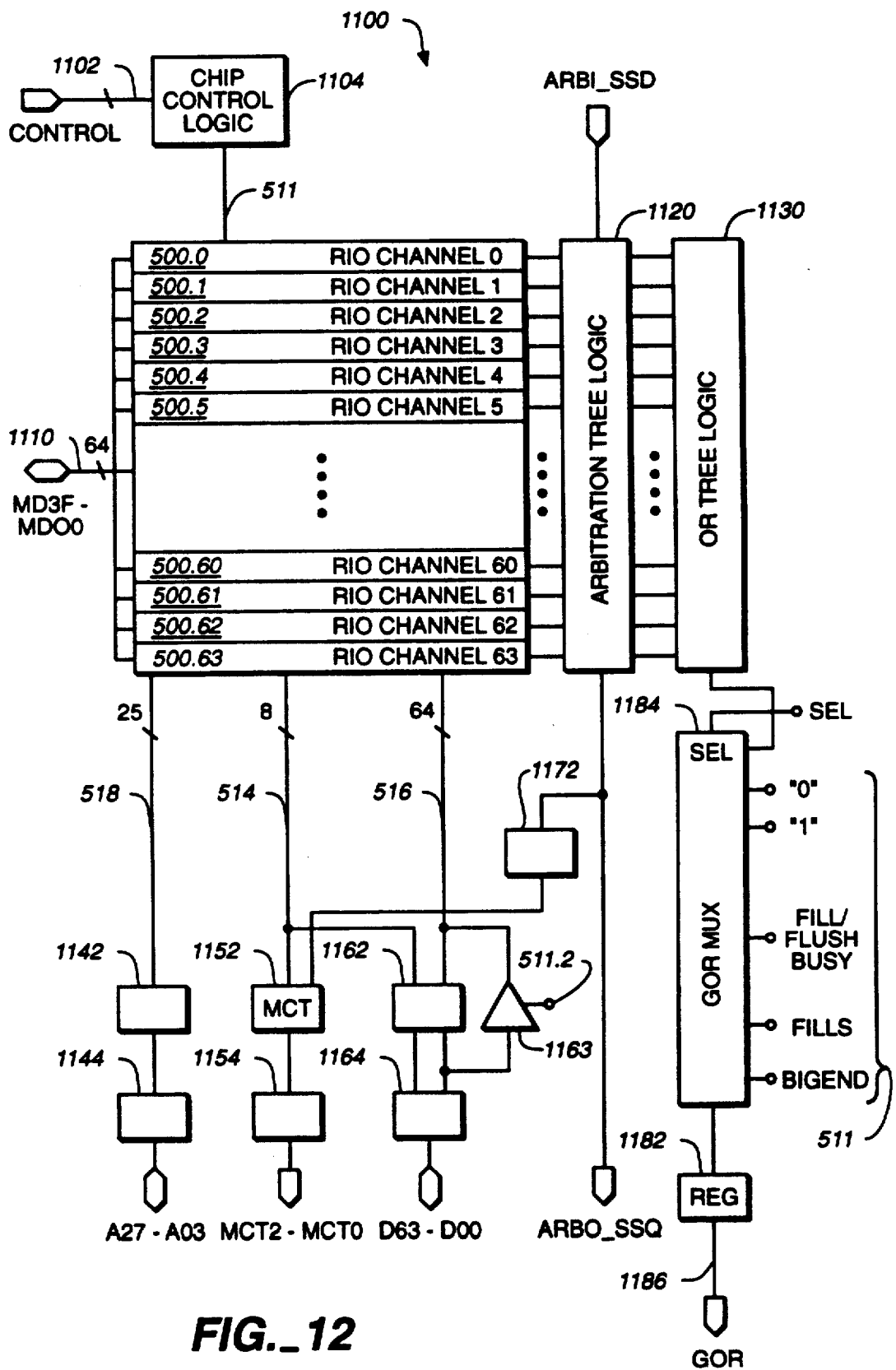
FIG._12

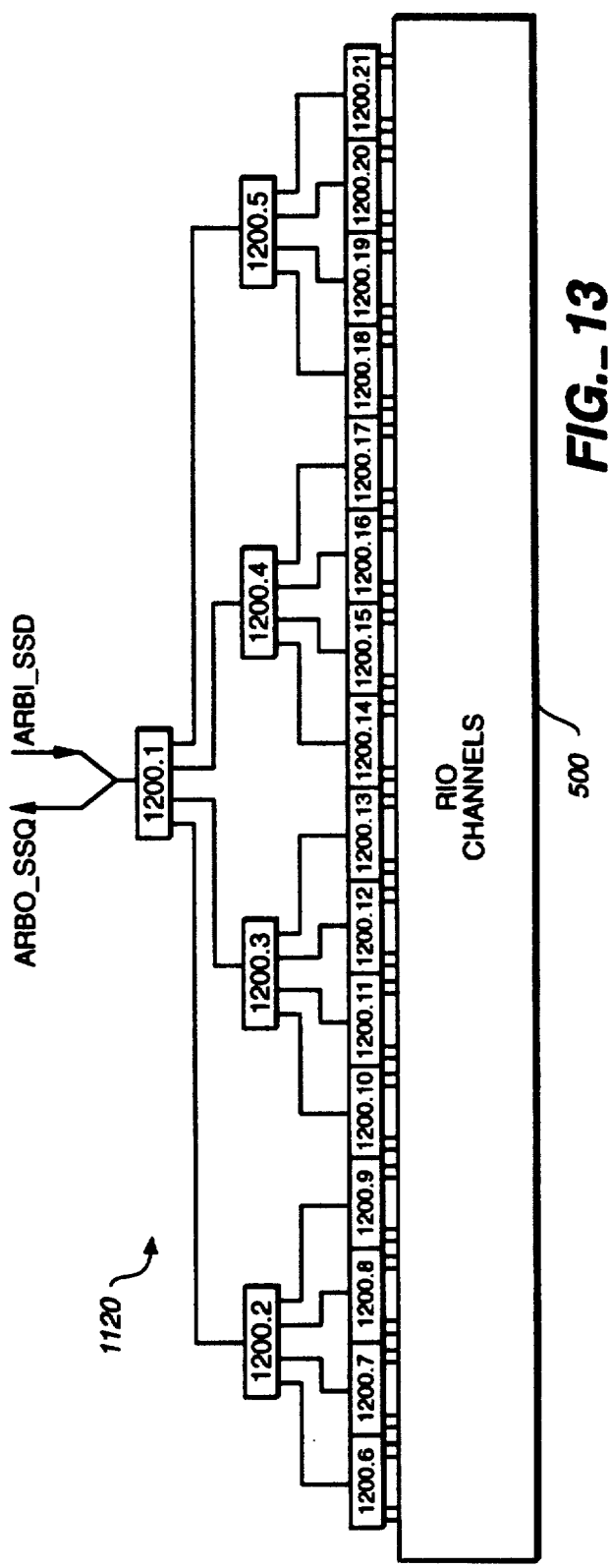
FIG._13
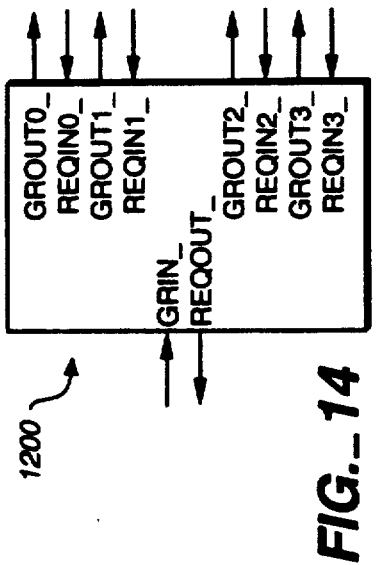
FIG._14

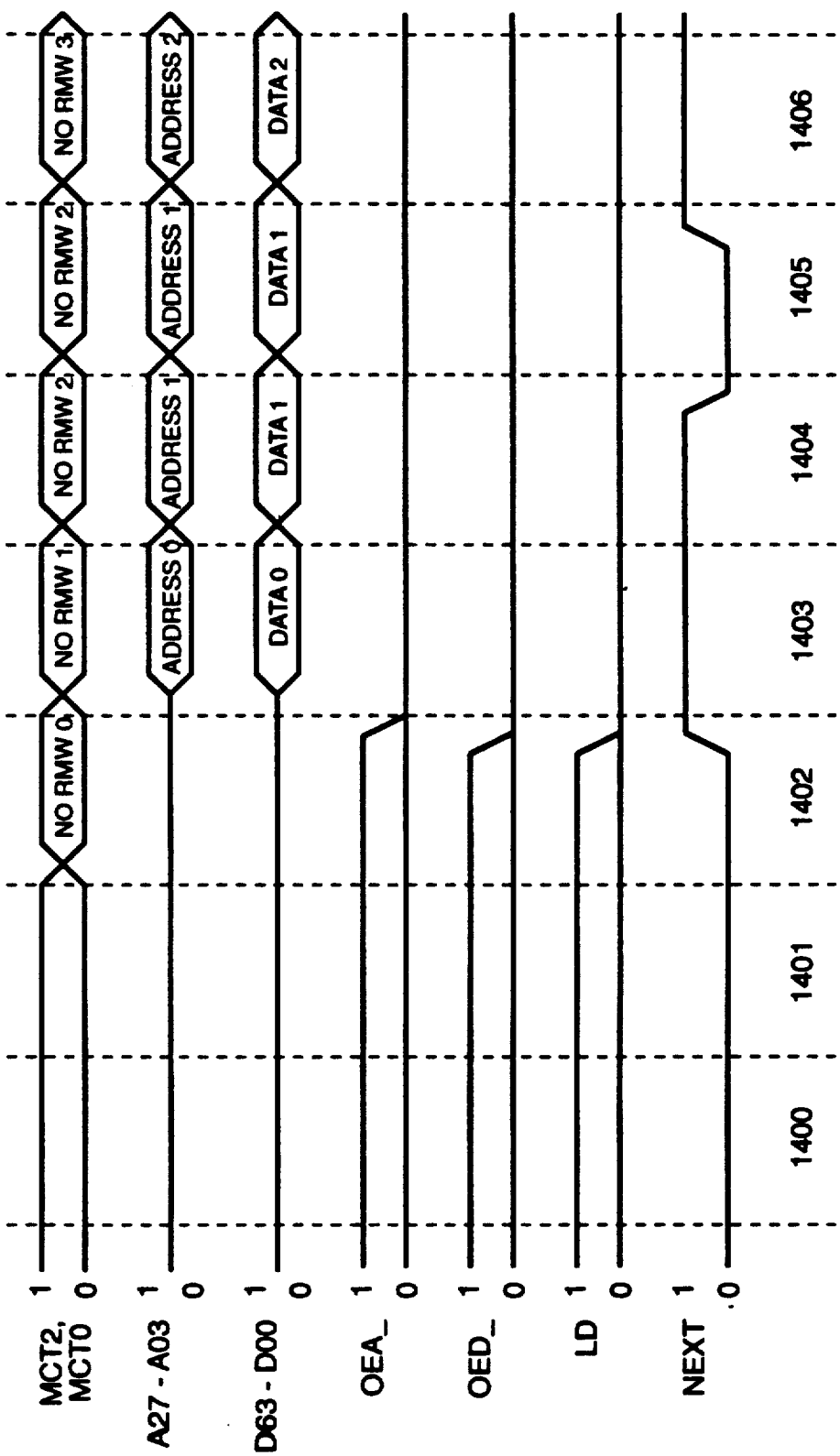
FIG._15

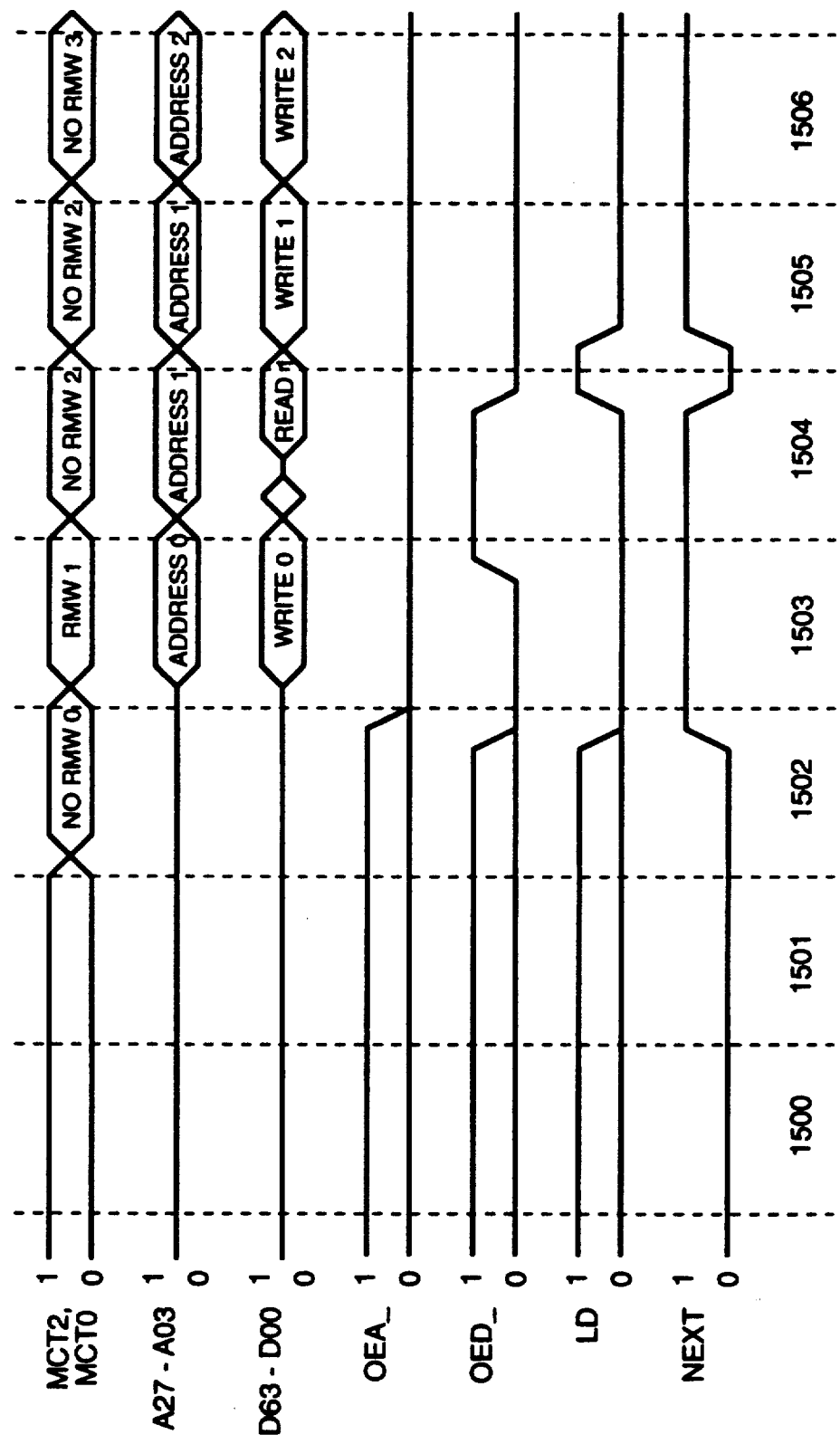
FIG._16

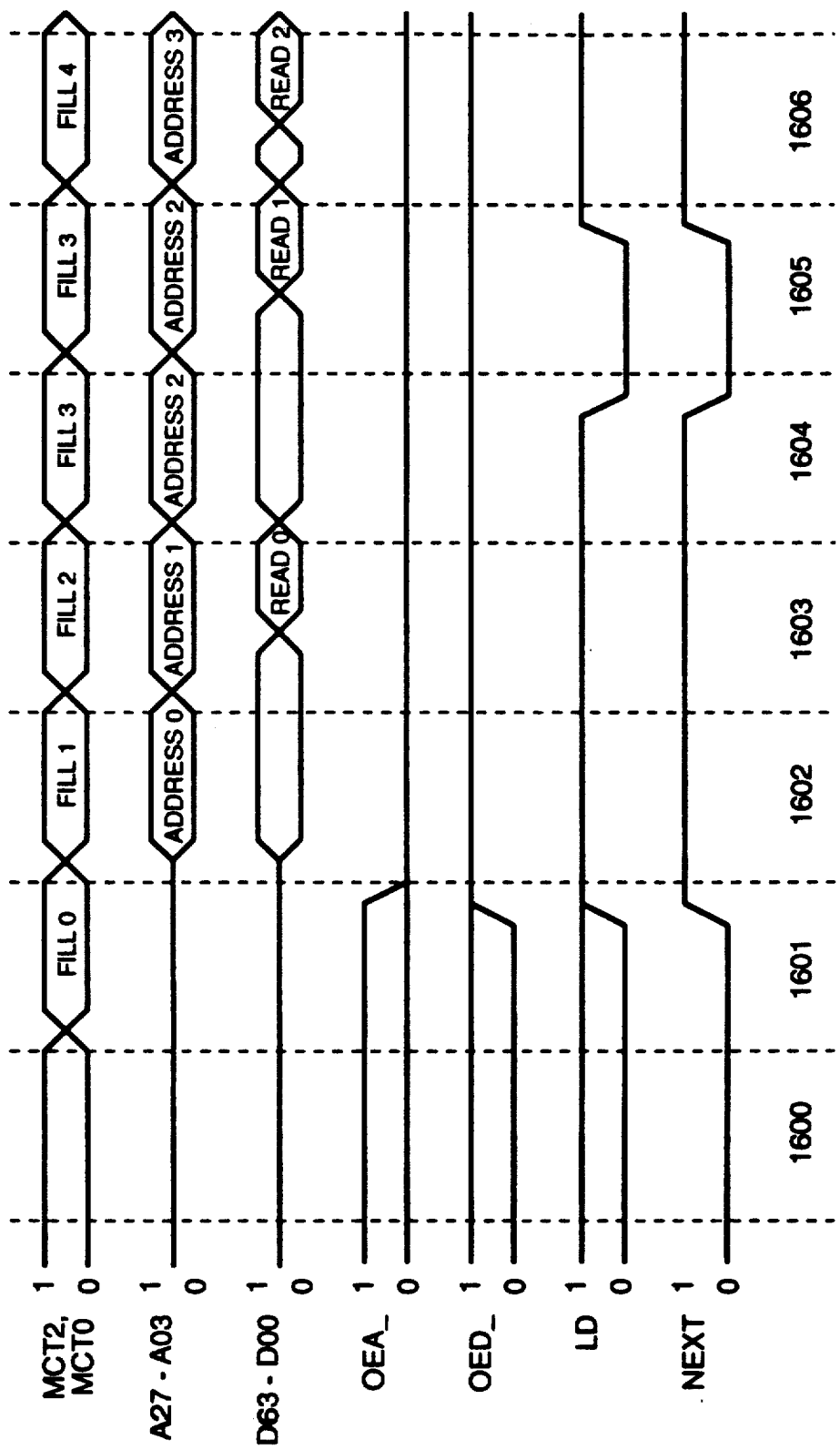
FIG._17

INPUT/OUTPUT SYSTEM FOR PARALLEL PROCESSING ARRAYS

BACKGROUND OF THE INVENTION

1. Field of the Invention

The present invention pertains to input/output systems for parallel processing arrays, and more specifically to I/O systems having programmable mapping for parallel processing arrays.

2. Description of Related Art

The organization of data and access methods in conventional I/O devices and files are well established. To be commercially successful, new computer systems such as massively parallel systems must read and write I/O data in a fashion compatible with existing conventions. However, computational algorithms for massively parallel processors with distributed memories require mapping the data in the problem onto the processors so as to optimize the interprocessor communications within the processor array. This data organization is potentially in conflict with the conventional ordering of I/O data.

Some existing I/O systems for massively parallel computers, such as the hypercube machines have I/O connections from each processor node in the hypercube, but do not map data from a single I/O device or file across all active nodes.

SUMMARY OF THE INVENTION

The present invention advantageously provides a low cost, high performance input/output subsystem for a massively parallel computer system. Generally, the invention provides a dynamic and flexible mapping between a massively parallel array of processors and the ordered data streams of conventional I/O devices and files. The programmable mapping transfers data between a high-speed device or file and an arbitrary active set of processors in parallel. The advantages of the present invention include programmability, simplicity, compatibility with conventional I/O access methods, I/O performance that scales with the processor performance, and cost effectiveness.

These and other advantages are variously achieved in accordance with one or more features of the present invention. Some of these features are as follows.

In accordance with one feature of the present invention, an I/O transfer is a single coordinated transfer between an array of processors and a single buffered I/O device, rather than being a collection of independent transfers between individual processors and attached individual I/O devices. Hence, thousands of processors may be connected with a single I/O device or file.

In accordance with another feature of the present invention, an I/O system uses a combination of a multistage router and RAM addressing, rather than fixed processor connections at the edges or vertices of the processor array. Hence, data may be distributed in a programmable way from a single I/O device across thousands of processors with their own local memories.

In accordance with another feature of the present invention, a combination of multistage self-routing router steering and RAM addressing reduces the potential router contention and reduces the performance spread from 1024:1 down to 16:1. I/O RAM is made to behave as 16 banks rather than 1024. The use of bank pairs reduces the effect to 8 banks.

In accordance with another feature of the present invention, the I/O system behaves like a global, shared, addressable buffer memory directly accessed by the processor array, rather than a fixed wiring between the processors and devices.

In accordance with another feature of the present invention, all processors are fully and equally connected to any I/O device, rather than being directly connected to some individual devices and not being connected to other devices.

In accordance with another feature of the present invention, I/O data are stored in conventional byte, word, or record form rather than in bit-serial form, and is thus compatible with conventional I/O file formats.

In accordance with another feature of the present invention, an I/O transfer involves a programmable active set of processors, rather than the full connected processor array.

In accordance with another feature of the present invention, the active processors have the autonomy to read or write data at any target address in the I/O stream buffer, rather than being assigned a fixed mapping onto the file.

In accordance with another feature of the present invention, the target I/O address is locally computed in each processor, and reliance is placed on a combination of self-routing in the multistage network and local addressing in the RIO and IORAM. Arbitrary permutations of data records onto the processor array are supported.

In accordance with another feature of the present invention, I/O read operations take advantage of the bidirectional capability of the multistage router network to first transmit the target I/O offset address and then fetch the data over the same connection, thus minimizing the latency and improving performance. The processors originate connections with I/O addresses, so that the I/O devices themselves need not originate connections back to the processors.

In accordance with another feature of the present invention, the I/O RAM buffer memory and RIO array are partitioned into boards, and each board connects with a subset of the router network ports. The board pin count is reduced, and the performance of the I/O system is scalable. In one embodiment, the I/O system is scalable over a 16 to 1 span.

In accordance with another feature of the present invention, I/O transfers are pipelined through the bidirectional router network and RIO buffers to make reads nearly as fast as writes.

In accordance with another feature of the present invention, the I/O channel has an interleaving mechanism that permits IORAM and other devices to be physically partitioned into several boards and yet behave as a single logical device.

In accordance with another feature of the present invention, the I/O system can read or write I/O data in either little-endian or big-endian formats for objects of size 8, 16, 32, and 64 bits, using a combination of the PE, router, and RIO logic.

In accordance with another feature of the present invention, the MP-1 processor array is a distributed memory system. UNIX I/O is most reasonably viewed as a linear sequence of bytes. The kernel idea uses a global shared memory (IORAM) that's accessible from all the distributed memory processors as a staging area for all UNIX I/O. Using this approach, the IORAM acts as a buffer for all I/O transactions which provides a seamless interface for all NFS traffic, RAM disk file systems, scatter/gather operations to/from the PE array, and interfaces to a variety of UNIX devices like disk systems, frame buffers, etc.

The present invention also advantageously provides a design for a cost-effective integrated circuit chip capable of meeting the performance and flexibility requirements of both a router network and an IORAM subsystem. One attribute is balancing the time required for serial router data transfers with the time needed for parallel I/O data transfers, which allows the system to obtain the most benefit from overlapping serial router transfers with parallel I/O RAM buffer memory transfers. Other attributes, such as byte addressing with no alignment restrictions and support for data sizes of 8, 16, 32, and 64-bits, allow the massively parallel I/O system to be flexible and easy to use. Some of the features of the integrated circuit chip of the present invention are as follows.

One feature of the present invention is the use of a 4-bit byte counter that allows each RIO element to independently access or not access its 64-bit data register. The lower 3-bits of the byte counter addresses the byte within the 64-bit register while the 4th bit enables (if zero) or disables (if one) access. The disabling/enabling feature becomes important for handling transfers that are not aligned to the 64-bit word.

Another feature of the present invention is to use eight byte-valid bits to achieve partial writes of a 64-bit word to the parallel memory. Each of the 8 bits corresponds to a byte of the 64-bit data register. If the byte-valid bit is one, then the corresponding byte has been modified and so needs to be written to the memory. Depending on the pattern of byte-valid bits, the RIO chip performs a straight 64-bit write; a high or low 32-bit word write, or read-modify-write.

Another feature of the present invention is the use of a four way tree arbiter to achieve fast determination (every clock cycle) of which RIO element will have access to the parallel memory address and data buses. A normal daisy chain would not have been fast enough to handle 64 RIO channels.

Another feature of the present invention is the use of the mechanism of swapping between the serial registers and the corresponding parallel registers to achieve a simple, low overhead (1 cycle) method of transferring data between the serial and the parallel portions of the chip.

Another feature of the present invention is to support multiple independent router connections, one per RIO channel, to permit only active processors to perform I/O operations.

Another feature of the present invention is to support bank-pair configurations through the use of, for example, an even/odd address decoding and arbitration chain, to reduce the number of logical banks in the system by one-half, and in turn reduce the maximum router contention by one-half.

Another feature of the present invention is to check for valid connections between processors and RIO channels by checking a transmitted parity bit against a self-addressing parity value derived from the physical position of each channel in the RIO chip.

BRIEF DESCRIPTION OF THE DRAWINGS

In the application, where like reference numerals indicate like parts,

FIG. 1 is a logical block diagram of an I/O system for a massively parallel processing array;

FIGS. 2 and 3 are schematic diagrams useful for explaining a feature of the I/O system of FIG. 1;

FIG. 4 is a physical block diagram of a massively parallel processing array;

FIG. 5 is a block diagram showing one way of grouping RIO channels in the I/O system of FIG. 1;

FIG. 6 is a block diagram of an illustrative RIO channel;

FIG. 7 is a block diagram of control logic for the illustrative RIO channel of FIG. 6;

FIG. 8 is a flow chart of an I/O write operation;

FIG. 9 is a flow chart of an I/O read operation;

FIG. 10, which comprises FIG. 10A and FIG. 10B, is a flow chart of a fully overlapped I/O read operation;

FIG. 11 is a block diagram illustrating a bank pair configuration;

FIG. 12 is a block diagram of an RIO integrated circuit;

FIG. 13 is a block diagram of the arbitration logic of FIG. 12.

FIG. 14 is a block illustration of an Arbcell which is used in the arbitration logic of FIG. 13.

FIG. 15 is a graph showing normal Flush Pipeline Timing;

FIG. 16 is a graph showing Read-Modify-Write Flush Pipeline Timing; and

FIG. 17 is a graph showing one mode of normal Fill Pipeline Timing.

DESCRIPTION OF THE PREFERRED AND OTHER EMBODIMENTS

Although the following description is in the context of a single instruction, multiple data, or "SIMD," distributed memory parallel processor, the principles are equally applicable to multiple instruction, multiple data, or "MIMD," distributed memory parallel processor systems. A suitable SIMD system is more fully described in the copending U.S. applications Ser. No. 07/461,492 of Nickolls et al., Scalable Inter-Process and Processor to I/O Messaging System for Parallel Processing Arrays, filed Jan. 5, 1990; Zapisek, Router Chip for Processing Routing Address Bits and Protocol Bits Using Same Circuitry, Ser. No. 07/461,551 filed Jan. 5, 1990; Taylor, Network and Method for Interconnecting Router Elements within Parallel Computer System, Ser. No. 07/461,572 filed Jan. 5, 1990; and Kim et al., Parallel Processor Memory System, Ser. No. 07/461,567 filed Jan. 5, 1990; and is incorporated herein by reference. In a specific, nonlimiting example, the SIMD system has distributed memory and 16,384 processor elements (hereinafter "PE"). The 16,384 processors are efficiently connected with an I/O subsystem so that a single high-speed I/O device can exchange data with all the active processors in parallel.

Massively Parallel I/O System

In the massively parallel input/output ("I/O") system 10 having a data path as illustrated in FIG. 1, thousands of PEs in the processor array are programmably connected with a few I/O devices. A processor element array 20 includes, for example, from 1,024 PEs to 16,384 PEs. Each cluster of 16 PEs shares a port into a router interconnection network 30, so there are from 64 to 1024 fully independent one-bit serial connections 22 between the PE array 20 and the router network 30. Processor elements and PE clusters are described more fully in the aforementioned applications of Nickolls et al. Ser. No. 07/461,492 and Kim et al. Ser. No. 07/461,567, and are incorporated herein by reference.

The router interconnection network 30 is used both for I/O communications and for simultaneous PE to PE communications. The ports for PE to PE communication are omitted for clarity. Each port of the router network 30 is implemented with a bit-serial connection. A suitable router network 30 is described more fully in the aforementioned U.S. applications Ser. No. 07/461,492 and 07/461,492 of Nickolls et al., and Taylor Ser. No. 07/461,572, and a suitable router chip is described more fully in the aforementioned U.S. application Ser. No. 07/461,551, of Zapisek, and are incorporated herein by reference.

The I/O system 10 is based on a globally shared addressable I/O RAM buffer memory 50 that has both high-speed bus ports 52 to the I/O devices and other ports 42 into a router interconnection system that connects with the PE array 20. To this end, the router network 30 is connected to a router I/O (RIO) element array 40 by from 64 to 1024 fully independent one-bit serial connections 32. The RIO element array 40 provides the "corner turn" conversion between the massive array of bit-serial router ports 32 and a few parallel 64-bit ports 42 with the buffer RAM 50. The I/O RAM buffer 50 is partitioned into banks such as 50.0 through 50.15, for example. The number of banks can be configured from 1 to 64. The RIO array 40 includes RIO elements 40.0 through 40.15 respectively corresponding to the banks 50.0 through 50.15. Each RIO element 40.0–40.15 converts bit-serial router data into conventional byte and word formats, and contains registers that hold the I/O RAM address and data during I/O read and write operations. The registers are used to serialize or de-serialize the address and data and to pipeline the data transfers. Each RIO element 40.0–40.15 accepts RAM addresses from the PE array 20 and uses them to address the I/O RAM buffer 50 during I/O read and write transfers. The I/O RAM buffer 50 is connected to the I/O channel 70, a high speed bus, through I/O channel interface 60. Each of the banks 50.0 through 50.15 of the I/O RAM buffer 50 is connected to the I/O channel 70 by a respective one of the interface units 60.0 through 60.15. I/O devices such as illustrated at 80 and 82 are connected to the channel 70. Blocks of data move over the channel between the I/O devices 80 and 82, or to or from the I/O RAM buffer 50.

At a high level of abstraction, the massively parallel I/O system 10 operates as follows. Each active processor element, or PE, in the processor array 20 computes a target offset within the file or I/O device 80/82. Only those PEs that are enabled with their E-bit (generally indicated at 220) set to 1 participate in I/O transfers. A programmable number of bytes are then transferred between each PE and its respective target position within the file or device. Either sequential or random mapping is supported. PE enabling and the E-bit are described more fully in the aforementioned U.S. application Ser. No. 07/461,567 of Kim et al., and are incorporated herein by reference.

Sequential I/O data mapping onto active PEs is shown in FIG. 2. A sequential file 200 of 4-byte records 200.1, 200.2, et. seq. is distributed across the PE array 210, one record per PE, by enumerating the active PEs and using the enumeration value times 4 as the target offset (generally indicated at 230) in the file 200. The active PEs 210.1, 210.2, 210.3, 210.5, 210.7 and 210.9 transfer 4 byte data groups 200.1, 200.2, 200.3, 200.4, 200.5 and 200.6 respectively to or from the file 200, and each has one 4-byte record to process. This mapping of I/O data records onto the active processors is consistent with the data parallel mapping paradigm used to program applications on massively parallel computers.

Random I/O data mapping onto active PEs is shown in FIG. 3. The active PEs, namely 310.1, 310.2, 310.3, 310.5, 310.7 and 310.9 as indicated by the set E-bit (indicated generally at 320), compute their respective target offsets in the file 300, namely 20, 4, 60, 12, 24 and 0; and transfer their respective 4 bytes from the file 300, namely bytes 300.6, 300.2, 300.8, 300.4, 300.7 and 300.1. In this fashion, arbitrary mappings between the PE array 300 and the file 300 are established as needed. Each PE of the SIMD parallel processor is given sufficient autonomy to establish a connection with the I/O data stream and compute its own offsets in target file 300.

The relationship between the router interconnection network 30 and the RIO element array 40 is more fully shown in FIG. 4. In one illustrative implementation, 16 PEs form a cluster, with 64 clusters, or 1,024 PEs, per board. In this illustrative implementation, the massively parallel processor comprises 16 boards, for a total of 16,384 PEs. These are represented by PE array 20. Each cluster of 16 PEs shares a port into the router interconnection network 30; hence, the size of ports 410 is 1024 connections. In one illustrative implementation of the router network 30, each of the ports 410 are bit-serial connections, so each router port is implemented with a single wire. Multi-bit connections may be used, if desired.

The router interconnection network 30 is bidirectional, and comprises one or more switch stages. The illustrative implementation shown in FIG. 4 uses two stages 420 and 430 for input and output, and three stages 420, 430 and 440 for PE to PE communications. In one variation (not shown) of the FIG. 4 arrangement, independent separate router networks are used, one for PE to PE connections and one for PE to I/O connections. With separate networks, a single switch stag would suffice for establishing I/O connections.

Messages are transmitted in bit-serial form, one bit per clock. Wider data paths could be used to transmit several bits per clock. Each of the router stages 420, 430 and 440 connects input wires to output wires according to an address selection tag transmitted prior to the message. A PE establishes a connection with a target PE or RIO element by transmitting the target address. Each of the router stages 420, 430 and 440 resolves part of the address to select an output wire. The router stages 420, 430 and 440 are pipelined, to permit the connection process to consume several clocks without affecting the subsequent pipelined message transmission time over the established connection.

As the illustrative implementation has 1,024 PE clusters, each router switch stage has 1,024 input wires and 1,024 output wires. Each of the switch stages 420, 430 and 440 steers inputs to selected inputs or outputs much like a crossbar switch, but the network is self-routing. To open connections, each originating or source PE first sends the desired target port address to successive router stages to select a switch path to the target port of the RIO element array 40. Once a connection with the target port of the RIO element array 40 is established, data may be sent to the target port of the RIO element array 40 to implement an I/O write, or the network direction may be reversed and data may be fetched from the target port of the RIO element array 40 to implement an I/O read. The router stages have pipeline registers to support high data rates over physically long paths, as described more fully in the aforementioned U.S. application Ser. No. 07/461,492, of Nickolls et al., and is incorporated herein by reference.

Note that an element of the RIO element array 40 does not originate a connection with a PE; rather, it is the target of a connection originated by a PE. This economical arrangement is possible because the router connection is bidirectional. A PE of the PE array 20 initiates the connection with the target element of the RIO element array 40, and an address for the I/O buffer RAM 50 and the router direction is then set to accomplish an I/O read or write.

In the illustrative massively parallel processor, up to 1024 I/O connections are handled concurrently. For purposes of modularity, the 1024 router wires 460 are grouped into 4 I/O wire bundles each of 256 bits; one such bundle 590 is shown in FIG. 5. Each of the bundles (such as 590) connects with up to 4 physical I/O RAM boards, one of which (I/O RAM board 0) is shown at 592. Each I/O option slot in the backplane (not shown) of the massively parallel processor services up to 256 router wires, thus each I/O RAM buffer board or RAM-like special I/O device board (not shown) in the illustrative massively parallel processor can handle one quarter of the maximum router system bandwidth. Four cooperating I/O RAM boards can transfer data at the full router system bandwidth. The 1024 I/O subsystem connections 460 occur between the second router stage 430 and the third router stage 440, and thus simply taps off the router connections already in the backplane for PE to PE communications. Alternatively, and especially in higher performance systems, separate router systems for PE/PE communication and I/O may be used.

The interconnections between RIO channels on the illustrative I/O RAM board 592 and the second stage routers 430 are shown in FIG. 5. The second router stage is arranged as 16 router chips 430.0-430.15, each with 64 output ports arranged as 16 output groups of 4 ports each. In router chip 430.0, for example, the sixteen output ports are S2_0_X0 through S2_0_XF. Each group of four output ports is connected to four input ports on a target RIO chip. Note, for example, the four independent connections from port S2_0_X0 of the router chip 430.0 to port MDx0 ("x" has the value 0-3 to represent the four wires of the port) of the RIO chip 40.0. Each I/O RAM board (such as 592) has 256 router input ports connected to four RIO chips (such as RIO chips 40.0-40.3), each with 64 input ports. As more fully described in the aforementioned application Ser. No. 07/461,492 of Nickolls et al., incorporated herein by reference, the router chips in the router interconnection network 30 select one of 16 output groups by decoding a four bit target address. For example, the output group "0" from each second stage router chip 430 is connected to the RIO chip 40.0. Similarly, the output group "1" from each second stage router chip 430 is connected to the RIO chip 40.1. The second stage router output groups 4-7 select I/O RAM board 1 having RIO chips 40.4-40.7 (not shown), and so on through I/O RAM board "3". The connections associated with output groups 4-15 are omitted from FIG. 5 for clarity, as are the connections to the third stage routers 440. The interconnections of the RIO element array 40 to the second stage routers 430 of the router interconnection network 30 accommodate routing operations generally in a manner more fully described in the aforementioned applications Ser. No. 07/461,492 of Nickolls et al., and Zapisek Ser. No. 07/461,551, and is incorporated herein by reference.

Each RIO chip 40.0-40.3 is associated with a bank of RAM memory in the I/O RAM buffer 50. Thus, the router interconnection network 30 serves to direct connections to the proper bank of the I/O RAM buffer 50. In an alternative embodiment discussed below in association with FIG. 11, the RIO chips of the RIO element array 40 and the banks of the I/O RAM memory 50 are arranged in bank-pairs, and each router port is connected to two RIO chips.

An illustrative group 500 of sixty-four essentially identical RIO elements or channels 500 are shown in FIG. 6. In one embodiment of the present invention, a RIO chip comprises 64 RIO channels 500. The RIO channel 500.63 is shown in detail. The RIO channel 500.63 includes channel control logic 512, which in accordance with various control signals CP_CTRL from a chip control logic circuit 1104 (FIG. 12) received over chip control lines 511 (reference numeral 511 is also used herein to refer to individual chip control lines), controls the implementation of a number of logic functions, including: control of the transceiver 502 to control access between the connected external router channel of a router chip in the second stage routers 430 and bit-serial bus 504; and the monitoring of signals on the bit-serial bus 504 to handle such functions as parity calculation, destination (router) address decoding, parallel arbitration, parallel pipeline timing, and de-serialization of incoming PE data and storage of the result in the data register 520 or the address register 540. These functions are controlled by signals distributed throughout the RIO channel 500.63 on channel control lines 513 (reference numeral 513 is also used herein to refer to individual channel control lines).

The RIO channel 500.63 has a bit-serial router interface section comprising router bit-serial bus 504, a 64-bit data shift register 524, an 8-bit byte-valid shift register 528, and a 25-bit address shift register 544; and a parallel RAM interface section comprising the 64-bit parallel data bus 516 and an associated 64-bit data parallel register 522, the 8-bit byte-valid bus 514 and an associated 8-bit byte-valid parallel register 526, and the 25-bit parallel address bus 518 and an associated 25-bit address parallel register/incrementer 542. From another perspective, the two 64-bit registers 522 and 524 and the two byte-valid registers 526 and 528 form, with other circuit elements, a data register 520; and the two 25 bit registers 542 and 544 form, with other circuit elements, an address register 540.

In the data register 520, the shift register 524 comprises eight 8-bit shift registers, the inputs to which are identified by numerals 1-8 respectively. Router serial data is serially shifted into or out of any one of the eight shift registers of register 524 from or onto the bit-serial bus 504, based on the value stored in a 4-bit byte counter 530 and on a control signal 513 from the channel control logic 512, which are furnished to an array of drivers/decoders 529. The three least significant bits of the counter 530 control which byte of the register 524 is accessed by the decoder array 529, while the most significant bit controls whether the driver/decoders 529 are in read/write mode or in idle mode. An eight bit byte-valid serial register 528 is associated with the register 524, such that each bit thereof corresponds to a respective byte of the register 524. As a byte is loaded into the register 524, the corresponding valid flag in the byte-valid register 528 is set by suitable logic in the drivers/decoders 529. Byte counter 530 functions both as an incrementer (by 1) or as a shift register that is accessed serially to (via controllable buffer 531, in accordance with a control signal 513 from the channel control logic 512) and from the bit-serial bus 504. The byte counter 530 operates in two modes to handle little-endian and big-endian byte ordering within the shift register. The other register 522 is a 64-bit parallel register that shadows the register 524. A 64-bit word can be swapped in a single cycle between the 64-bit parallel register 522 and the eight 8-bit shift register register 524. The 64-bit parallel register 522 controllably loads from or drives the 64-bit parallel data bus 516 via 64 controllable (in accordance with respective control signals 513) transceivers 521. Every parallel data register 522 of every RIO channel 500 in the group 500 shares bus 516.

A byte valid bus 514 contains 8 flag bits that indicate whether the corresponding byte in the 64-bit data word on bus 516 is valid or not. Every byte-valid parallel register 526 of every RIO channel 500.x in the group 500 shares bus 514, which is driven via eight controllable (in accordance with respective control signals 513) buffers 525 corresponding to the eight respective byte-valid flag bits. The byte-valid flag bits are used by register 522 during read-modify-write RAM cycles for byte masking. Typically, a Read-Modify-Write RAM cycle is performed as follows. The data in the data serial register 524, which includes good and bad data, is copied (swapped with) the data in the data parallel register 522. Then, in accordance with an address on address bus 518, a 64-bit word is read from I/O RAM buffer memory 50, but is loaded into the data parallel register 522 such that only the bad data is overwritten. The overwriting of the bad data is implemented by activating a subset of the controllable transceivers 521 corresponding to the bytes containing bad data. Next, the entire data in the data parallel register 522 is written back into the I/O RAM buffer memory 50, in accordance with the address on address bus 518.

In the address register 540, the shift register 544 controllably loads from or drives, via controllable (in accordance with a control signal 513) buffer 546, the router bit-serial bus 504. The 25-bit parallel register/incrementer 542 controllably drives the parallel address bus 518 via 25 controllable (in accordance with respective control signals 513) buffer 541. The parallel address bus 518 is shared by all the RIO elements 500.x in the group 500. The 25-bit address is swapped between the shift register 544 and the parallel register/incrementer 542 in one cycle.

Each RIO router port has a pipeline register 503 so that it operates properly with the pipelined router stages.

A portion of the channel control logic 512 that performs parity calculations, a "parity computer" 610, is shown in FIG. 7. A parity bit is transmitted with the address tag and with each data word to ensure data integrity. A source PE in the PE array 20 calculates route requesting header information for the I/O channel it seeks to connect to, and also calculates the parity bit corresponding to the particular I/O channel address. This is possible because each RIO channel 500.x has a unique position based on its position in the RIO chip 40.x the position of the RIO chip 40.x on the IORAM board, and the position of the 10 RAM board in the system. The receiving PE or, in the case of the I/O system 10, the receiving RIO channel such as, for example, channel 500.63, is responsible for checking parity in its parity computer 610, and in the event of a parity error, communicating a parity error signal to initiate a global error signal. Before the parity bit appears on the bit-serial line 504, the parity register 616 loads its self-parity from input M_APAR, which is derived from signal APAR and is either APAR or APAR_ depending on the parity of the position of the RIO channel 500.x. When the parity bit appears on the bit-serial line 504, it is selected by multiplexer 612 and applied to the input of an exclusive OR gate 614 which receives at its other input the output of the parity register 616. The output of the exclusive OR gate 614 is then latched into the parity register 616, and the latched value is applied to an input of the GOR multiplexer 632 through AND gate 630. This input of multiplexer 632 is selected when a global parity error determination is desired to be made in the GOR tree 1130 (FIG. 1). Note that if desired, parity may be loaded directly into the parity register 616 from the bit-serial line 504, or a "1" value can be preloaded into the parity register 616 to initialize odd parity. In addition, parity may be inverted if desired by selecting the "1" input in multiplexer 612. Moreover, in the event of a global parity error, the parity of the RIO channel 500.x can be sampled through controllable buffer 618 to determine whether the error occurred in the particular channel 500.x. The parity computer also calculates parity of outgoing data by processing the outgoing serial data through the exclusive OR gate 614 and the parity register 616, and furnishes the calculated parity to the bit serial line 504 through controllable buffer 618.

FIG. 7 also shows an exclusive OR gate 602 placed between the 3-bit output of the byte counter 530, which controls the data serial register 524 (FIG. 6), for the purpose of selecting little endian or big endian ordering in the register 524.

A pipelined sequence can be established where for an I/O write, bit-serial data is moved from the PEs of the PE array 20 to the shift registers 524 or 544 of the RIO channel 500.63, while concurrently previously moved data is read from parallel registers 522 and 542 and written to the I/O RAM buffer 50. A transfer of data from the I/O RAM buffer 50 over the channel 70 to the I/O devices such as 80 and 82 can also be pipelined concurrently. The process is reversed for I/O reads; pipelining requires opening a connection from the PEs of the PE array 20 to the RIO elements 500, transferring the RAM address, then requesting a RAM read. While the parallel reads are filling the parallel data registers, the PEs can re-establish the previous connections and obtain serial data obtained in the previous cycle.

I/O Transfer Operations

I/O transfer operations using the I/O system 10 shown in FIG. 1 uses concurrent pipelined data transfers between the PE array 20, the RIO element array 30, the I/O RAM buffer 50, and the I/O device 80 (and/or 82). Depending on how the router interconnection network 30 is connected to the PE array 20, an explicit transfer between the registers and memory of the PEs in the PE array 20 may be needed. The I/O device 80 may also be buffered internally and require a transfer between its buffer and the device proper.

Alternatively, viewing this multilevel I/O system structure from the perspective of I/O system operating software, the distributed memory of the PEs in the PE array 20 has the characteristic of application data memory, while the I/O RAM buffer 50 has the characteristic of an operating system kernel buffer memory. From this perspective, the router interconnection network 30 and the RIO element array 40 are a mechanism for moving data between the application program and the kernel buffers, and the I/O channel 70 is used to move data between the kernel buffers and the I/O device 80.

The transfers relevant to the massively parallel I/O system 10 are those between the PE array 20 and the I/O RAM buffer memory 50. In the illustrative implementation of FIG. 1, these transfers take the form of I/O read and write instructions that move data operands between the registers of the PEs in the PE array 20 and the I/O RAM buffer memory 50. Because the illustrative I/O system 10 is SIMD, all active PEs in the PE array 20 perform the I/O instructions concurrently, but the microcoded sequence of controls issued from the control unit of the PE array 20, or ACU, actually loops until all the active PEs in the PE array 20 succeed, because each cluster of 16 PEs is multiplexed onto a single router port. The loop may require more than 16 iterations if router contention occurs. The ACU and its control operations are described more fully in the aforementioned application of Kim et al. Ser. No. 07/461,567, and are incorporated herein by reference.

A I/O read or write instruction for the I/O system 10 has the following operands: IORAM Target Start Address, PE Start Register, Transfer Byte Count, Object Size, IO Table Index, and I/O Table Entry.

The I/O Table Index specifies an entry in the I/O table which is accessible only by the ACU operating system software. The table entry represents the device being accessed; it specifies a base address and limit address in the I/O RAM buffer 50 for protection purposes. This permits the I/O instructions to operate in user mode without further protection, because they can only access a limited region of the I/O RAM.

The Transfer Byte Count represents the number of bytes to be moved between the register block of each of the active PEs in the PE array 20 and the target address in the I/O RAM buffer 50. It is the same for all PEs in the PE array 20.

The IORAM Target Start Address is contained in a register of a PE in the PE array 20, so each PE in the PE array 20 can locally compute its own I/O target address. The PE Start Register is the lowest numbered register of a block of registers in each PE of the PE array 20 that contain the data to be written or that will receive the data to be read. Further details of memory and registers in the PEs of the PE array 20 are disclosed in the aforementioned application of Kim et al. Ser. No. 07/461,567, and are incorporated herein by reference.

The Object Size may be 8, 16, 32, or 64 bits; the transfer byte count is a multiple of the object size. The object size is used to control byte ordering; the IO Table Entry indicates whether the IORAM data is to be interpreted as little-endian or big-endian format. The I/O instruction treats the IORAM region being accessed as an array of objects each 1, 2, 4, or 8 bytes long in order to convert them to the natural byte ordering of the PE array. The object array may have arbitrary alignment in the IORAM.

An I/O write operation 700 is shown in FIG. 8. Also known as flush mode, the I/O write proceeds with the following microcoded steps that involve the ACU (not shown), PE array 20, I/O router interconnect network 30, RIO element array 40, and I/O RAM buffer memory 50. Please refer to FIG. 8.

First (step 702), each PE in the PE array 20 breaks its target IORAM address into a router address for a RIO port, which is a port of the RIO element array 40, and an offset in the IORAM bank, which is a bank of the I/O RAM buffer 50, associated with the selected RIO port. See generally the text above associated with FIGS. 2 and 3. The RIO port is arbitrarily chosen, except that as a practical matter, the correct IORAM board and the correct IORAM bank on that board must be chosen. In the illustrative I/O system 10, only 4 router address bits are significant (only 3 router bits are significant in a bank-paired arrangement described below). The other router address bits are chosen in a way to minimize router contention, by making those bits the same as the originating PE's own router address. Router contention is minimized because identity permutation is non-blocking. Routing is more fully described in the aforementioned applications Ser. No. 07/461,492 of Nickolls et al., and Taylor Ser. No. 07/461,572, and is incorporated herein by reference.

Second (step 704), a connection is attempted by the active set of PEs in the PE array 20 to the target RIO ports by transmitting the port number to the first and second router stages 420 and 430 (FIG. 4). Some of the active PEs will succeed, but some may not and must retry later. The parity of the target RIO port number is transmitted and checked by the RIO chip (step 706). Each RIO channel sets an internal channel valid bit if a connection is established. The channel valid bit is functionally equivalent to a flag known as the flag in the PEs, which is described more fully in the aforementioned application Ser. No. 07/461,492 of Nickolls et al., and incorporated herein by reference.

Third (step 708), each active PE in the PE array 20 sends its IORAM bank offset word address to the RIO port where it is loaded into the register 544 of the address register 540 (FIG. 6). Parity is also transmitted and checked (step 710).

Fourth (step 712), each active PE in the PE array 20 sends the initial byte offset to the RIO port where it is loaded into the byte counter 530.

Fifth (step 714), each active PE in the PE array 20 sends data bytes to the RIO element array 40, where they are loaded into the register 524 of the data register 520. Each complete byte sets the corresponding byte-valid bit and increments the byte counter 530. Parity is also transmitted and checked (step 716).

Sixth (step 718), the ACU (not shown) now waits for any previous RIO parallel flush operations to complete by monitoring the global OR (GOR) status of the RIO parallel busy signal.

Seventh (step 720), when parallel flush operations are no longer in progress, the serial address and serial data contained in serial registers 544 and 524 respectively are swapped with the data contained in the parallel registers 542 and 522 respectively, initiating an automatic parallel flush. Other bits such as the channel valid bit ValidS and the byte-valid bits BVS are copied from the serial section to the parallel section.

Eighth (step 722), the connection in the router interconnection network 30 is closed. The RIO channel valid bit is retrieved by the connecting PE in the PE array 20, and is used to turn off the enable or Tflag of the connecting PE in anticipation of a subsequent attempt cycle. The Tflag is more fully described in the aforementioned application Ser. No. 07/461,492 of Nickolls et al., and is incorporated herein by reference.

Ninth (step 722), the register swap step (step seven above) initiates a parallel flush. Each channel with valid data is selected by the arbitration tree to have access to the memory. All the valid RIO data in the parallel data register 522 are written to the I/O RAM buffer 50. Read-modify-write cycles are done when the need is indicated by the byte valid bits (MCT 1152, FIG. 12). When all the channel valid registers are cleared, the Fill/Flush Busy signal is reset.

Tenth (step 724), steps two through nine of the I/O write operation repeat until all PEs in the PE array 20 succeed.

An I/O read operation 800 is shown in FIG. 9. Also known as normal fill mode, the I/O read 800 proceeds with the following microcoded steps that involve the ACU (not shown), PE array 20, router interconnection network 30, RIO element array 40, and I/O RAM buffer memory 50.

First (step 802), each PE in the PE array 20 breaks its target IORAM address into a router address for a RIO port, which is a port of the RIO element array 40, and an offset in the IORAM bank, which is a bank of the I/O RAM buffer 50, associated with the selected RIO port. See generally the text above associated with FIGS. 2 and 3. The RIO port is arbitrarily chosen, except that as a practical matter, the correct IORAM board and the correct IORAM bank on that board must be chosen. In the illustrative I/O system 10, only 4 router address bits are significant (only 3 router bits are significant in a bank-paired arrangement discussed below). The other router address bits are chosen in a way to minimize router contention, by making those bits the same as the originating PE's own router address. Router contention is minimized because identity permutation is non-blocking. This step is essentially identical to the corresponding first step in the I/O write operation sequence.

Second (step 804), a connection is attempted by the active set of PEs in the PE array 20 to the target RIO ports by transmitting the port number to the first and second router stages 420 and 430 (FIG. 4). Some of the active PEs will succeed, but some may not and must retry later. The parity of the target RIO port number is transmitted and checked by the RIO chip (step 806). Each RIO channel sets an internal valid bit if a connection is established.

Third (step 808), each active PE in the PE array 20 sends its IORAM bank offset word address to the RIO port where it is loaded into the register 544 of the address register 540 (FIG. 6). Parity is also transmitted and checked (step 810).

Fourth (step 812), the ACU (not shown) waits for any previous RIO parallel fill operations to complete by monitoring the global OR (GOR) status of the RIO parallel busy signal.

Fifth (step 814), when no parallel fill operations are in progress, the serial address and serial data contained in serial registers 544 and 524 respectively are swapped with the data contained in the parallel registers 542 and 522 respectively, initiating an automatic parallel fill.

The channel valid bit is copied from the serial section to the parallel section.

Sixth, during the automatic parallel fill, each RIO channel with its channel valid bit set fills its parallel data register 522 with the IORAM word specified by the parallel address register 542. When all the channel valid registers are cleared, the Fill/Flush Busy signal is reset.

Seventh, when the automatic parallel fill has completed (step 816), the parallel data register 522 is swapped with the serial data register 524 in the data register 520 (step 818).

Eighth (step 820), each PE in the PE array 20 sends the Initial Byte Offset to the RIO port where it is loaded into the corresponding byte counter 530.

Ninth (step 822), each connecting PE fetches data bytes from their respective serial data register 524. Parity computed by the corresponding RIO chip is also fetched and checked by the connecting PEs (step 824).

Tenth (step 826), the connection in the router interconnection network 30 is closed. The RIO channel valid bit is retrieved by the connecting PE in the PE array 20, and is used to turn off the enable or Tflag of the connecting PE in anticipation of a subsequent attempt cycle.

Eleventh (step 828), steps two through ten of the I/O read operation 800 repeat until all PEs in the PE array 20 succeed.

A fully overlapped I/O read operation 900 shown in FIG. 10, in which parallel filling is overlapped with serial fetching, is similar to the I/O read operation, but involves opening a connection and transmitting the address to initiate the parallel fill, then reopening the previous connection to fetch serial data from the previous fill operation. Following are the specific differences.

First, when the parallel side of the I/O system 10, which includes the parallel section of the RIO channels 500 and the I/O RAM buffer memory 50, is filling each RIO channel 500 with IORAM data words for the first time (step 914), register 544 of the address register 540 is loaded with the bank offset word address for the I/O RAM buffer memory 50 from the next set of PEs, which is the initial PEs with their E-bits on minus the PEs that were successful in the first connection attempt. Accordingly, the current E-bit state is saved in a queue maintained by microcode in 3 bits worth of PE registers (step 916), channel valid bits are retrieved by the PEs successful in making connections to the RIO element array and the E-bits of the successful PEs are cleared (step 918), the current E-bit state is saved in a queue (step 920), additional router connections to the RIO channels 500 are attempted (step 924) after a check to determine whether PEs exist having E-bits not yet cleared (step 922), an open parity check is made (step 926), the active PEs send IROAM addresses to the address registers in the RIO channels 500 (step 928), an address parity check is made (step 930), and again, channel valid bits are retrieved by the PEs successful in making connections to the RIO element array and the E-bits of the successful PEs are cleared (step 932), the current E-bit state is saved in a queue (step 934). In this way, the time to send the next IORAM bank offset word address through the serial router wires is overlapped with the first parallel fill.

Second, when the parallel side of the I/O system 10 is done with the first fill (step 936), the swap command is performed such that the filling of each RIO channel for the next set of addresses will begin immediately (step 938). Now, while the second fill is proceeding on the parallel side, the data serial registers 522, which now contain the data read from IORAM in the first fill, are transferred (fetched) to the PEs in the PE array 20. According, the E-bits of the PEs in the PE array 20 are restored from queue slot three (step 940), router connections are attempted from the active PEs of the PE array 20 to the RIO channels 500 in the RIO element array 40 (step 942), an open parity error check is made (step 944), the initial byte offset is sent to byte counters 530 in the RIO channels 500 (step 946), data bytes are fetched from the data registers 524 in the RIO channels 500, and a data parity error check is made (step 950). Thereafter, the next set of PEs, which comprises the initial PEs with their E-bits on minus the PEs that were successful in the previous connection attempts, opens a router connection and send its IORAM bank offset word addresses to registers 544 in the RIO channels 500. Accordingly, the E-bits of the PEs in the PE array 20 are restored from the queue slot 1 (step 952) and the process flow loops back through steps 922, 924, 926, 928, 930, 932, and 934. This, then, overlaps both the fetching of the data from the RIO channels 500 and the setup of the next IORAM offset addresses with the parallel fill of each of the RIO channels 500. At this point, steps in the loop are repeated until no more PEs need to be filled.

Third, to keep track of the various sets of PEs during the overlapped I/O read operation, the microcode implements, using PE registers, a three slot queue, implemented as a shift-register, of E-bits. When a new E-bit state is saved in this queue (steps 916, 920, and 234), it is placed in slot 1, while the E-bit state in slot 2 is transferred to slot 3 and the E-bit state in slot 3 is lost. Nominally, E-bit state in slot 1 represent PEs that still have not successfully opened a connection with RIO elements 40, slot 2 represents the PEs corresponding to the currently on-going parallel fill, and slot 3 represents the PEs that have data in the serial register 524 which is to be transferred (fetched) to the PEs.

The last fetch sequence comprising steps 954, 956, 958, 960, 962, 964, and 966 is similar to the sequence of steps 936, 938, 940, 942, 944, 946, 948, and 950, except that in step 958, the E-bits of the PEs in the array 20 are restored from queue slot 2.

A counter mode is used in either fill or flush when each PE of the PE array 20 has more than one consecutive 64-bit word to send to or retrieve from the I/O RAM buffer memory 50. This mode is similar to the normal fill or flush mode except that the starting address of the memory access is sent only at the beginning. From then on, the address is simply incremented using the parallel address register/incrementer 542 until all the words for a given PE are transferred. This mode can be very efficient because the cost of sending the address is amortized over many data words, and full overlap of the router and parallel operations is allowed during a fill operation. That is, the next word can be filled on the parallel side while the current word is being transferred over the router interconnection network 30.

An Illustrative RIO Chip

The I/O RAM buffer 50 connects with 1024 router ports 42 to obtain the full router network bandwidth. The grouping of RIO channels 500 into RIO chips 40.x is based on such practical factors as pin limitations on printed circuit boards and chips. For example, in one embodiment, each RIO chip 1100 supports only 64 of the 1024 router wires in the router interconnection network 30. Hence, a minimum of 16 RIO chips 1100 are used to achieve the maximum data rate. If this data rate is to be matched on the parallel side, each of the 16 RIO chips 1100 are connected to a separate bank of memory that is 64 bits wide. Therefore, the I/O RAM buffer 50 is divided into 16 physical banks denoted 50.0–50.15 associated with, respectively, RIO channel groups 40.0–40.015, as shown in FIG. 1. The I/O RAM buffer 50 behaves as one logical memory partitioned into 16 physical banks.

The worst case router contention during a PE/RIO connection is exactly equal to the number of physical memory banks in the system. That is, with 16 banks in the I/O RAM buffer memory 50, the worst case router contention is 16X the best case. The best case is no contention except for source cluster contention. Therefore, a reduction in the number of physical banks of the I/O RAM buffer memory 50 is desirable.

The RIO chip 1100 supports a configuration that is known as bank-pair configuration. This configuration, in essence, halves the number of physical banks in the I/O system 10 by allowing 128 router wires to access a 128 bit wide memory. FIG. 11 shows the bank-pair configuration. Four RIO chips 1000, 1001, 1010 and 1011 are connected in a crossbar fashion to two 64-bit wide memories 1002 and 1012. This allows each of the 128 router wires to access either of the two memories 1002 and 1012. The two RIO chips that connect to the same memory also connect to common address and data buses—RIO chips 1000 and 1001 share memory bank 1002 over address bus 1003 and data bus 1004, while RIO chips 1010 and 1011 share memory bank 1012 over address bus 1013 and data bus 1014.

An arbitration daisy chain connects the two commonly-connected RIO chips—for example, RIO chips 1000 and 1001, and RIO chips 1010 and 1011—such that only one chip is selected to use the memory. On the router side, because two RIO chips, such as 1000 and 1010, for example, share the same 64 router wires (e.g., router wires 1020), the RIO chip 1100 is designed to support an even or odd address personality mode. One of the two RIO chips sharing the same 64 router wires is set to the even personality, and the other is set to the odd personality. During the router open operation, the valid bit will be set on one and only one of the two channels that share each router wire. Which channel gets the valid bit depends on the value of the Even/Odd bit in the router open address.

The bank-pair configuration is implemented in the control logic 512 during destination (router) address decoding, as follows. With reference to FIG. 7, which shows a bank-pair configuration computer 620, once a source PE in the PE array 20 establishes a connection with a target RIO channel 500.x, a protocol or channel valid bit appears on the bit-serial line 504 of both of the RIO channels 500.x in the connected bank paired RIO chips (for example, RIO chips 1000 and 1010) to indicate a successful connection. RIO chips that do not receive the channel valid bit remain idle. Inside each of the channels 500.x in the connected bank paired RIO chips, the channel valid bit is applied directly to the channel valid serial register 626. The next bit appearing on the bit-serial line 504 is the Even/Odd select bit, which is applied to the exclusive OR gate 622 along with a control signal EVEN. Signal EVEN assigns an odd and an even personality respectively to the two RIO chips in the bank pair. The output of the gate 622 and the output of the channel valid serial register 626 are ANDed in gate 624, and latched into the channel valid serial register 626. The output of the channel valid serial register 626 is applied to an input of the GOR multiplexer 632, and is selected and applied to the OR tree logic 1130 (FIG. 12) to ensure that at least one channel is open. The channel valid serial register 626 is copied into the channel valid parallel register 627, which is used for determining whether the particular channel 500.x is valid for a swap operation.

Note that the output of the channel valid register 626 is ANDed with the output of the parity register 616, to ensure that only active channels contribute parity data.

An illustrative RIO chip 1100 is shown in FIG. 12. The basic function of the RIO chip 1100 is to take serial router data from the router interconnection network 30 and convert it to parallel data for the I/O RAM buffer memory 50, and vice versa. To this end, the RIO chip 1100 includes a serial interface and a parallel memory interface. The parallel memory interface is driven by a separate, single phase clock that is independent of the massively parallel processor ACU system clock.

The RIO chip 1100 receives control signals from the massively parallel processor ACU (not shown) on control lines 1102. The control logic 1104 is responsive to these control signals to control some of the various operations carried out on the data path shown in FIG. 6. Other control signals are taken off of the router bit-serial bus 504 and processed in control logic 512 within each of the RIO channels 712.

Sixty-four RIO channels 500.0-500.63 are included in the RIO chip 1100. Each of the RIO channels 500 is connected to a respective one of the router wires 1110 for a total of 64 router wires.

The memory-cycle-type status signals, MCI2-MCT0, indicate the type of memory cycle necessary (e.g. read, write, read-modify-write, etc.). To reduce RIO chip 1100 pin count, these status signals are encoded in MCT encoder 1152 from the information on the byte-valid bus 514 and the "active" signal output from the arbitration tree logic 1120 available at register 1172, in accordance with whether fill or flush mode is current. The MCT2-MCT0 signals are registered by a pipeline stage 1154.

The parallel address, data, and byte-valid signals are each registered by two pipeline stages; respectively, registers 1142 and 1144, registers 1162 and 1164, and registers 1162 and 1164. Therefore, the data and address going out of the chip is available one pipeline later than the MCT2-MCI0 signals. The byte-valid signals do not propagate out of the chip. They are kept in the last pipeline stage 1164 before the output for use in a read-modify-write cycle. During the read part of the read-modify-write cycle, the data is clocked into the last pipeline stage 1164 only and does not propagate back to the parallel data registers in the RIO channels 500. The byte sections of the last pipeline stage 864 that have a zero in the corresponding byte-valid bit are loaded during the read portion of the read-modify-write. All other bytes are not altered.

The three parallel buses, namely the data bus 516, the address bus 518, and the byte-valid bus 514, are shared by the 64 RIO channels 500. In parallel operation, the arbitration tree logic 1120 determines which of the RIO channels 500 can access the parallel buses 514, 516 and 518. Due to pipelining, the different parallel buses 514, 516 and 518 may or may not simultaneously belong to the same RIO channel, depending on the direction of data flow.

The arbitration logic 1120 is further illustrated in FIG. 13. The arbitration logic 1120 decides which of the 64 RIO elements 500 will have access to the parallel address bus 518, data buses bus 516, and byte valid bus 514. While a standard daisy-chain structure could be used for arbitration logic, daisy-chains are slow because the grant lines must propagate through all possible requesters—64 in this case. To achieve faster arbitration, the arbitration logic 1120 advantageous uses a tree structure. The tree used is a four-way tree (four branches at each node) with three levels. The ARBI-_SSD and ARBI_SSQ signals are connected to the root node.

Each node 1200.1-1200.21 consists of an Arbcell 1200, illustrated in FIG. 14. The Arbcell 1200 has a total of 10 signals connected to it, a grant and request signal for each branch, viz. grout0_ and reqin0_ for branch 0, grout1_ and reqin1_ for branch 1, grout2_ and reqin2_ for branch 2, and grout3_ and reqin3_ for branch 3; plus a grant and request signal grin_ and reqout_ for the node. The node gives highest priority to branch0 followed by branch1, branch2, and then lastly, branch3. A request out from the node indicates that one or more branches have their requests active. A grant into the node indicates that the node and its branches have priority.

The arbitration tree structure allows the arbiter to decide which RIO element 500 will get the parallel buses at every clock cycle. The maximum settle time is approximately 5 Arbcell delays.

The logic equations for the Arbcell 1200 are:

$$grout0\_ = grin\_$$
$$grout1\_ = grin\_ + reqin0\_$$
$$grout2\_ = grin\_ + reqin0\_ + reqin1\_$$
$$grout3\_ = grin\_ + reqin0\_ + reqin1\_ + reqin2\_$$
$$reqout\_ = reqin0\_ * reqin1\_ * reqin2\_ * reqin3\_$$

Note that all signals are active low.

A single bit OR-tree 1130 OR-sums the contribution from each of the RIO channels 500 in the RIO chip 1100. This single signal, ORed with other chip level status, then drives a GOR output pin on the RIO chip 1100. The single GOR pin allows status and errors to be reported back to the ACU (not shown) directly without the need to go through the router interconnection network 30 and then to the PE array 20.

In one embodiment, the RIO chip 1100 includes the pin functions set forth in Table 1.

TABLE 1

| Pin Name | Type | # Pins | Clock Ref. | Description |
|---|---|---|---|---|
| D63-D00 | I/O | 64 | CLK | Parallel data bus |
| OED_ | I | 1 | CLK | Parallel data bus output enable |
| A27-A03 | O | 25 | CLK | Parallel address bus |
| OEA_ | I | 1 | — | Parallel address bus output enable |
| MCT2-MCT0 | OD | 3 | CLK | Memory cycle type status (open drain) |
| PRST | I | 1 | CLK | Parallel pipeline reset |
| NEXT | I | 1 | CLK | Next address enable |
| LD | I | 1 | CLK | Load enable (from data bus into RIO chip) |
| MD3F-MD00 | I/O | 64 | PH1/PH2 | Bit serial router lines |
| RCS | I | 1 | PH1 | *Router chip select |
| RDIR | I | 1 | PH1 | *Router direction |
| PFRZ | I | 1 | PH1 | *Communications freeze |

TABLE 1-continued

| Pin Name | Type | # Pins | Clock Ref. | Description |
|---|---|---|---|---|
| GDS2-GDS0 | I | 3 | PH1 | *GOR drive select |
| RTC3-RTC0 | I | 4 | PH1 | *Router interface control |
| GOR | O | 1 | PH2 | Global OR output |
| DENA | I | 1 | PH1 | *Diagnostic mode enable |
| ARBI/SSD | I | 1 | CLK/PH1 | Valid daisy chain/ serial data in |
| ARBO/SSQ | O | 1 | CLK/PH1 | Valid daisy chain/ serial data out |
| RESET | I | 1 | — | Reset input |
| EVEN | I | 1 | — | Even or odd personality mode select |
| APAR | I | 1 | — | Even or odd self-address parity mode select |
| PH1 | I | 1 | — | Phase 1 DPU system clock |
| PH2 | I | 1 | — | Phase 2 DPU system clock |
| CLK | I | 1 | — | Parallel interface clock |
| OGND | — | 12 | — | Output Ground |
| OVCC | — | 8 | — | Output Power (+5) |
| IGND | — | 4 | — | Internal Ground |
| IVCC | — | 3 | — | Internal Power (+5) |

Note that the inputs marked with asterisks are registered on-chip before driving any internal logic. Therefore, there will be a cycle of delay between the signal's assertion at the pin and its effect.

Following is a detailed description of the parallel interface pins of the RIO chip 1100.

D63-D00. Parallel data bus 516. During a flush operation (data from RIO element array 40 to I/O RAM buffer memory 50), 64 bit data from the RIO chip 1100 is driven onto this bus 516. The pipeline is configured such that the data (and address) are presented one pipeline cycle after the MCT2-ACT0 output status (see below). During a fill operation (data from I/O RAM buffer memory 50 to the RIO element array 40), 64 bit data is latched onto the RIO chip 100 from this bus 516.

OED_. Clocked output enable for D63-D00, the parallel data bus 516. This pin is an active low input. It is registered on-chip and so its effect occurs after the rising edge of CLK following the pins assertion. If OED_ becomes high (inactive), the data bus will be tristated after the rising edge of CLK. If OED_ was low (active) in the previous clock cycle and the MCT2-MCT0 output status was active (not idle) in the previous pipeline cycle and OEA_ is low (active), the RIO chip 1100 drives the parallel data bus 516 during the current clock cycle. Otherwise, the parallel data bus 516 is tristated.

A27-A03. parallel address bus 518. During either a fill or flush operation, this bus 518 supplies the 64-bit-word address. The address, like the data, is presented one pipeline later than the MCT2-MCT0 status lines.

OEA_. Asynchronous output enable for A27-A03 and D63-D00. This pin is an active low input. It is not registered and so its effect is asynchronous. If OEA_ is high (inactive), the address bus 518 and the data bus 516 are tristated. If OEA_ is low (active) and the MCT2-MCT0 status was active (not idle) in the previous pipeline cycle, the RIO chip drives the address bus 518 during the current pipeline cycle. Otherwise, the address bus 518 is tristated. In addition, if the address bus 518 is being driven by the RIO chip 1100 and OED_ was low (active) in the previous clock cycle, then the data bus 516 is driven in the current clock cycle.

MCT2-MCT0. Memory cycle type status out. These three open drain outputs indicate the type of memory cycle that is necessary. The codes, which are encoded from the byte valid flags based on whether fill or flush mode is current, [[?]] are listed in Table 2.

TABLE 2

| MCT2-MCT0 | Status |
|---|---|
| 000 | Flush: Write data on D63-D00. No read-modify-write necessary. |
| 001 | Flush: Write data on D31-D00 only. No read-modify-write necessary. |
| 010 | Flush: Write data on D63-D32 only. No read-modify-write necessary. |
| 011 | Flush: Read-modify-write necessary on D63-D00. |
| 100 | Fill: Read data on D63-D00. |
| 101 | Reserved. |
| 110 | Reserved. |
| 111 | Idle |

A non-idle status indicates that the chip has valid address/data and has been granted arbitration by the arbitration daisy chain, which comprises the arbitration tree logic 820 and the one-bit register 1172. [[?]]. The memory-cycle-type status is supplied one pipeline earlier then the address, A27-A03, and the data, D63-D00.

PRST_. Parallel pipeline reset input. When this input pin is asserted low with the rising edge of CLK, any on-going parallel operation is cleared and the parallel interface in the RIO chip 1100 enters the idle state. Specifically: MCT2-MCT0 is forced to idle the internal Fill/Flush busy flag in chip control logic 1104 is cleared; all parallel channel valid bits ValidP are cleared, and all internal parallel arbitration state is cleared. PRST_ is used after an error event (e.g. hard ECC or parity error in the I/O system 10 that causes the parallel operation to stall before completion. It should not be asserted during normal operation. Asserting PRST_ for more than one cycle will not hold the parallel interface in a reset condition. The reset function only occurs in the first cycle that this pin is asserted low.

NEXT. Pipeline advance. When this input pin is high, the status pipeline comprising the MCT 1152 and register 1154, the address pipeline comprising registers 1142 and 1144, and the data pipeline comprising registers 1162 and 1164 is advanced by one with the rising edge of CLK. If NEXT is low, the pipeline is frozen.

LD. Load data from parallel data bus 516. When this input pin is high, the data on D63-D00 will be loaded onto the RIO chip 1100 with the rising edge of CLK. During a flush operation (FILL low), an active LD signal will cause data to be loaded onto the bytes of the 64-bit word that is not to be modified (written) during the flush. The bytes that are to be modified will not be changed with the load.

During a fill operation, when NEXT and LD are both high, data for the current pipeline stage will be clocked into the RIO chip 1100 with the rising edge of CLK (and the pipeline will be advanced). If LD is high and NEXT is low, data for the previous pipeline stage will be re-clocked into the chip with the rising edge of CLK (and the pipeline will not be advanced). This behavior allows corrected data to be reloaded into the R10 chip a pipeline later if a soft ECC error is detected.

Finally, if NEXT is high but LD is low during a fill operation, the data clocked into the current pipeline stage is the last data presented to the RIO chip on the rising edge of CLK in the cycle where the NEXT has transitioned from a high to a low.

Following is a detailed description of the router, or serial, interface pins of the RIO chip 1100.

MD3F-MD)0. Router lines. These bidirectional lines are the serial router data lines 1110. In input mode, with both RCS_ and RDIR low, these lines are registered by router serial pipeline registers (e.g., register 503) before driving any internal circuitry. In output mode, with RCS_ low and RDIR high, these lines are driven off-chip from the output of the router serial pipeline registers. In this output mode, each individual router line will be tristated if the channel ValidS register is zero. The ValidS register is functionally similar to the R-flag in the PEs.

RCS_. Router chip select. This input is an active low pin. When high, all router related functions of the RIO chip 1100 are disabled, the router pins are tristated, and the GOR output is zeroed. Also, all serial-scan and related diagnostic functions are disabled.

RDIR. Reverse router direction. This input controls the direction of the router lines 1110. When low, the router lines 1110 are in input mode. When high, the router lines 1110 are in output mode and driven by the RIO chip 1100 unless RCS_ is high.

PFRZ. Pipe freeze. When this input is high, router serial pipeline registers are disabled from being updated in both input and output mode. Also, the router interface controls, RTC3-RTC0, are disabled. The GOR output and router output pins MD3F-MD00, however, are not disabled. Neither are serial-scan and related diagnostic functions.

GDS2-GDS0. Global-OR drive select. These input pins control the drive on the GOR output pin 1186 (FIG. 11). The GOR output pin 1186 will be active if RCS_ is low. Otherwise, the output will be zero. Also, only the serial channels with ValidS bit high will contribute to the total OR value of the RIO chip 1100 when the Parity register is selected. The select codes are listed in Table 3.

TABLE 3

| GSD2-GDS0 | Operation |
|---|---|
| 000 | Select zero |
| 001 | Select ValidS register |
| 010 | Select Parity register |
| 011 | Select zero (reserved) |
| 100 | Select Busy register |
| 101 | Select FillS register |
| 110 | Select BigEnd register |
| 111 | Select one |

RTC3-RTC0. Router interface control. These input pins control the various bit-serial functions in the serial interface. If either PFRZ and/or RCS_ is high, the router interface controls will be disabled. The control codes are listed in Table 4.

TABLE 4

| RTC3-RTC0 | Operation |
|---|---|
| 0000 | Nop |
| 0001 | Load/drive/shift-right DataS, Load-XOR Parity |
| 0010 | Load/drive/shift-right AddressS, Load-XOR Parity |
| 0011 | Load/drive/shift-right ByteC, Load-XOR Parity |
| 0100 | Load/drive/shift-right DataS, Load-XOR Parity, Inc ByteC |
| 0101 | Load/drive ValidS, Load-XOR Parity |
| 0110 | Load ValidS with Even/Odd decode, Drive ValidS, Load-XOR Parity |
| 0111 | Clear ValidS, ByteC, ByteVS; Set Parity |

TABLE 4-continued

| RTC3-RTC0 | Operation |
|---|---|
| 1000 | Load-XOR/drive Parity |
| 1001 | Load/drive Parity |
| 1010 | Load Parity with Identity |
| 1011 | Toggle Parity, Drive Parity |
| 1100 | Load Fills (GDS1) and BigEnd (GDS0) modes |
| 1101 | Swap Address, Data; Copy Valid, ByteV, and Fill; Clear ByteC, ByteVS; Prime |
| 1110 | Increment AddressP; Swap Data; Copy Valid, ByteV, and Fill; Clear ByteC, ByteVS; Prime |
| 1111 | Swap Address, Data; Copy Valid, ByteV, and Fill; Clear ByteC, ByteVS; Prime |

By default, the internal bit-serial bus 504 will be driven low if no drives are selected and RDIR is high.

The exact function of code 0110 ("Load ValidS with Even/Odd decode . . .") is: ValidS = ValidS AND (bit-serial bus XOR EVEN). EVEN is the personality-mode-select input pin. Also, Parity = Parity XOR (bit-serial bus).

When code 1100 ("Load FillS and BigEnd modes") is selected, a FillS mode register in chip control logic 1104 is loaded from GDS1 and the BigEnd mode register in chip control logic 1104 is loaded from GDS0.

The exact function of code 1101 ("Swap Address . . .") is: swap contents of AddressS and AddressP; swap contents of DataS and DataP; copy contents of ValidS to ValidP; copy contents of ByteVS to ByteVP; copy contents of FillS to FillP; and clear ByteC and ByteVS. The parallel pipeline is primed such that the &t memory-cycle-type status propagates to the MCT2-MCT0 output pins. Note that this function is inhibited if the parallel interface is not idle (parallel busy is not zero).

The exact function of code 1110 ("Increment AddressP . . .") is: increment contents of AddressP by 1; swap contents of DataS and DataP; copy contents of ValidS to ValidP; copy contents of ByteVS to ByteVP; copy contents of FillS to FillP; and clear ByteC and ByteVS. The parallel pipeline is primed such that the first memory-cycle-type status propagates to the MCT2-MCT0 output pins. Note that this function is inhibited if the parallel interface is not idle (parallel busy is not zero).

The function of code 1111 is the same as code 1101 except that the parallel pipeline is no primed.

GOR. Global OR output. This output pin 1186 is the total OR-sum output from the RIO chip 1100. The output is driven from the free-running output pipeline register 1182. Therefore, global OR data is delayed by a total of two clocks from GDS2-GDS0 input to GOR output. As stated earlier, RCS_ must be low to enable the GOR output. If RCS_ is high, then GOR output will be driven zero. The delay from RCS_ to GOR being zeroed or unzeroed is also two clocks.

Following is a detailed description of the diagnostic and serial-scan pins of the RIO chip 1100.

DENA_. Diagnostic mode enable. When DENA_ is low, inputs GDS2-GDS0 take on alternate functions, as described in Table 5. For convenience in description, GDS2-GDS0 will be renamed as follows when DENA_ is low.

TABLE 5

| Pin | Alternate Name | Function |
|---|---|---|
| GDS0 | RTDIAG | Enable router diagnostic mode. |
| GDS1 | SENA | Enable serial-scan mode. |
| GDS2 | SCLK | Serial-scan clock. |

The alternate function RTDIAG (GDS0) is router diagnostic mode. When RTDIAG is high and RCS— is low, pull-up resistors are enabled on all router lines 1110, MD3F-MD00, and either a forward or reverse diagnostic operation is performed. With RDIR high, the router lines are driven out with data from the router serial pipeline registers (e.g., 503). With RDIR low, the data is latched from the router lines into the router serial pipeline registers. Note that in the bank pair configuration (FIG. 11), the two RIO chips that share the same router wires (for example, RIO chips 700 and 710) must not both have their RTDIAG pins high while RDIR is high (and RCS— low). Only one RIO chip out of the pair can be in reverse diagnostic mode at any given time. Otherwise, the two RIO chips may drive-fight on the router wires.

The alternate function SENA (GDS1) is serial-scan enable. When SENA is high, the router serial pipeline registers (e.g., register 503) are frozen, LD and NEXT inputs are disabled, and serial-scan clocking is enabled. There are 153 serial-scan bits. Their order is: MD00 (head), MD20, MD01, MD21, MD02, MD22, . . . , MD2E, MD0F, MD2F, followed by D00, D02, D04, . . . , D60, D62, followed by A04, A06, A08, . . . , A24, A26, followed by MD3F, MD1F, MD3E, MD1E, . . . , MD11, MD30, MD10, followed by A27, A25, A23, . . . , A07, A05, A03, and finally by D63, D61, D59, . . . , D05, D03, D01 (tail). Data recirculation, if desired, must be done externally. Note that if RTDIAG and SENA are both high, the diagnostic mode will have priority and the serial-scan mode will be inhibited.

The alternate function SCLK (GDS2) is serial-scan clock. A low-to-high transition on SCLK causes the scan chain to be shifted by one bit. (SENA must be high and RCS— must be low.) SCLK is synchronized to the standard system-clocks, PH1 and PH2. The scan-chain data is shifted by the second "PH1/PH2 pulse" following the assertion of SCLK.

ARBI/SSD. Arbitration tree in and serial-scan data in. This input has a double function. In normal operation with SENA low, this pin is the input for the channel arbitration tree 1120. A low on this input constitutes a grant by indicating that no higher priority RIO chips have valid data. With SENA high, ARBI/SSD becomes the serial-scan data input. The data from this input is clocked into the D01's pipeline register.

ARBO/SSQ. Arbitration tree out and serial-scan data out. This output 1122 has a double function. In normal operation with SENA low, this pin is the output for the channel arbitration tree 1120. A low on this output indicates that the RIO chip 1100 has no valid data. With SENA high, ARBO/SSQ becomes the serial-scan data output. The data from MD00's router serial register 530 is available at this pin 1122.

Following is a detailed description of several miscellaneous pins of the RIO chip 1100.

RESET$_{13}$. Reset input. When this input is low, D63-D00, A27-A03, and MD3F-MD00 are all tristated. Also, ValidS is cleared, and the functions described for PRST— are also carried out. RESET— functions asynchronously on assertion and will prevent drive fights when held low during power-on. On deassertion, however, the reset is internally held for one extra PHI/PH2 clock following the deassertion.

EVEN. Even personality mode select. When this input pin is high, the ValidS register is loaded with the inverted value from the internal bit-serial bus 504 (ANDed with the current ValidS value) during a "Load ValidS with Even/Odd decode" command (see control codes for RTC3-RTC0). Otherwise, with EVEN low, the ValidS register is loaded with the non-inverted value. This function is useful for selecting between the even and odd address chips (e.g. RIO chips 1000 and 1010) when the RIO chips are used in the bank-pair configuration shown in FIG. 11.

APAR. Self-address parity mode select. When this input pin is high, the Parity registers are loaded with ones for channels MDx0, MDx3, MDx5, MDx6, MDx9, MDxA, MDxC, MDxF and zeros for channels MDx1, MDx2, MDx4, MDx7, MDx8, MDxB, MDxD, MDxE during a "Load Parity with Identity" command. Otherwise, with this input pin low, the assignment of zeros and ones are swapped. This function is useful for calculating the self-address parity during the router-open phase.

PH1,PH2. Two-phase clock inputs. These clock pins are connected to the same two-phase clocks that drive the PEs in the PE array 20 and the chips of the router interconnection network 30. Both the router interface and the serial-scan circuitry are driven by these clocks.

CLK. Parallel interface clock input. This input furnishes the clocks for the parallel interface circuitry. In keeping with normal convention, the 0-to-1 transition of this clock is the active edge. CLK is allowed to be completely independent of the PH1/PH2 clocks.

FIGS. 15–17 are pipeline diagrams which illustrate the behavior of the parallel interface, including the timing relationships between various control signals and data.

FIG. 15 shows the timing diagram for a normal I/O Write or flush, with no read-modify-write (RMW) cycles. In cycle 1404, NEXT is forced to low. This prevents the RIO chip from advancing the parallel pipeline as evident from the no change in the MCT signals MCT2, MCT0, in the data signals D63-D00, and in the address signals A27-A03.

FIG. 16 shows the timing diagram for a I/O Write or flush, with a single read-modify-write cycle. The MCT lines in cycle 1503 indicate that a RMW cycle is necessary in the next cycle 1504. The read/modify phase of the RMW occurs in cycle 1504 followed by the write phase in cycle 1505.

FIG. 17 shows the timing diagram for a I/O Read, or fill. In cycle 1601, the MCT lines indicates that a fill is pending for the next cycle 1602. In cycle 1602, the address for the first read is presented by the RIO chip 1100 on the address lines A27-A03. In cycle 1603, the read data corresponding to the address presented in cycle 1602 is loaded into the RIO chip 1100. The NEXT signal is forced low in cycle 1604, preventing the parallel address pipeline (registers 1142 and 1144) and data pipeline (registers 1162 and 1164) from advancing, as evident from the no change in the MCT signals MCT2, MCT0 and the data signals D63-D00 from cycle 1604 to cycle 1605.

Other Parallel Side Elements

The portion of I/O RAM buffer 50 associated with each RIO chip pair of FIG. 7 may be implemented in a variety of conventional ways. An illustrative implementation uses conventional commercially available DRAM chips, each having four Mbit capacity organized as 1M words by 4bits per word. Each memory bank of the I/O RAM buffer 50 is 64 bits wide, and thus requires a minimum of sixteen DRAM chips, yielding a capacity of 8 MBytes. Parity or ECC protection is desirable and requires a few additional DRAM memory chips. The 25-bit address processed by the RIO chips 1100 permits RAM banks as large as 256 MBytes. The address must be multiplexed into a row and column address to drive a conventional DRAM, plus a chip select. The RIO chip 1100 also can write the low or high 32 bits of the 64-bit data bus, permitting the use of 32-bit ECC protection logic on the I/O RAM buffer array 50.

The I/O channel 70 and I/O channel interface 60 can be implemented in a variety of conventional ways. An illustrative channel implementation is a conventional bus that provides means to move data rapidly from one channel interface to any other channel interface. It is desirable that the channel interface logic be used consistently by all I/O RAM boards (e.g., 592) and I/O devices.

The I/O channel 70 provides interleaved access to multiple I/O RAM boards so that the entire collection of I/O RAM boards behave as a single logical memory. One way is to have each I/O RAM board respond to an appropriate subset of bus addresses. A typical channel transfer would involve four I/O RAM boards and one I/O device board. A first burst of words is fetched from one I/O RAM board and delivered to the device board (e.g., device 80), then a second through fourth burst is fetched from the other I/O RAM board, and the process repeats. For example, in one arrangement memory is interleaved with a granularity of 16 words, each word being 64 bits for a total of 1024 bits. Each I/O RAM board, then, responds to 16 consecutive bus addresses and does not respond to the following 48 addresses, which are handled by other I/O RAM boards. Note that the I/O boards derive their addresses from their physical placement, but that their addresses may be modified to accommodate configurations of either one, two, or four boards.

While the present invention has been described with respect to certain embodiments, the scope of the present invention is defined by the appended claims and is not necessarily limited to the embodiments described herein, which are merely illustrative. Accordingly, other embodiments and variations not described herein may be within the scope of the present invention, as defined by the appended claims.

What is claimed is:

1. An I/O system for performing a coordinated transfer of a plurality of data items between an I/O device and a plurality of active processor elements in a scalable massively parallel processor element array, comprising:
an array of router I/O chips, each of the router I/O chips having an address port, a word data port, and a plurality of router ports, and being operative to convert between word data format on the address and word data ports, and router data format on the router ports;
a router having a plurality of source router ports coupled to the processor elements and a plurality of target router ports coupled to the router ports of the router I/O array, and being operative to establish routing paths from active processor elements in the processor element array to respective targeted router ports of the router I/O array in accordance with routing information, and for maintaining the established routing paths to accommodate a bidirectional transfer of data thereon, wherein the router includes a stage comprising a plurality of router chips, and wherein each of the router chips includes a subset of the target router ports of the router stage; and
an I/O memory buffer coupled to the address and word data ports of the router I/O chips for buffering I/O transfers between the router I/O chips and the I/O device;
wherein the processor elements are operative to originate address information, including the routing information, and to transmit the address information for establishing the routing paths and for moving the data items between the processor elements and the I/O memory buffer over the established routing paths and through the router I/O array.

2. An I/O system as in claim 1, wherein the router chips form a second stage router in a three stage router interconnection network for bidirectional transfers between source processor elements and target processor elements of the processor element array.

3. An I/O system as in claim 1, wherein the I/O memory buffer comprises a plurality of memory banks grouped into bank pairs, each of the memory banks being connected to the address ports and the data ports of a respective two of the router I/O chips having a common address personality, and wherein within each bank pair,
the router ports of two of the router I/O chips respectively connected to the bank pair are connected to a first subset of the target router ports of the router, the two router I/O chips connected to the first subset of the target router ports of the router having different address personalities; and
the router ports of another two of the router I/O chips respectively connected to the bank pair are connected to a second subset of the target router ports of the router, the two router I/O chips connected to the second subset of the target router ports of the router having different address personalities;
and wherein the routing information includes personality selection information, for reducing router contention by a factor of two.

4. An I/O system as in claim 1, wherein the I/O memory buffer comprises a plurality of memory banks, and the processor elements comprise respective means for determining the address information so that a location in a particular one of the banks is identified.

5. An I/O system as in claim 1, wherein the I/O memory buffer and the router I/O chip array are partitioned into a plurality of printed circuit boards, the I/O memory buffer partitions being respectively connected to at least a subset of the router I/O chip array partitions through the first address and word data ports of the I/O memory buffer and the address and word data ports of the router I/O chips, and the router ports of the router I/O chip array partitions being connected to respective subsets of the target router ports of the router.

6. An I/O system as in claim 1 further comprising an I/O channel, wherein the I/O memory buffer is partitioned into a plurality of memory buffer printed circuit boards coupled to the I/O channel, each of the memory buffer printed circuit boards having means for interleaving data transferred between the I/O memory buffer printed circuit boards and the I/O channel so that the I/O memory buffer printed circuit boards operate as a single logical device.

7. An I/O system as in claim 1, wherein the router I/O chips comprise means for supporting little-endian or big-endian byte ordering of data objects of size 8, 16, 32, and 64 bits.

8. An I/O system as in claim 6, wherein the interleaving means comprises means for fetching a burst of words sequentially from the I/O memory buffer printed circuit boards to respective block addresses in the I/O device.

9. A scalable bandwidth I/O system for transferring a plurality of data items between an I/O domain comprising at least one I/O device and an array of processor elements ("PEs") in a massively parallel processor, comprising:
- an interconnection network having a plurality of source ports coupled to the PEs and a plurality of target ports, for synchronously establishing bidirectional routing paths from the network source ports to the network target ports in accordance with routing information from an active subset of the PEs, and for accommodating synchronous data transfer on the established bidirectional routing paths between the network source ports and the network target ports;
- a buffer memory for supporting an I/O data transfer between the buffer memory and the I/O domain; and
- a plurality of router I/O channels arranged in groups, each of the router I/O channel groups having a plurality of source ports respectively coupled to a subset of the network target ports so as to be targetable by the subset of active PEs, and a group address bus-data bus pair coupled to the buffer memory, wherein each of the router I/O channels comprises:
  - a channel bus coupled to a respective one of the router I/O channel source ports;
  - an address register for receiving address information from the channel bus and furnishing the address information to the group address bus; and
  - a data register for receiving output data from the channel bus and furnishing the output data to the group data bus, and for receiving input data from the group data bus and furnishing the input data to the channel bus.

10. An I/O system as in claim 9, wherein:
the channel bus is a serial bus;
the address register comprises:
- an address shift register for engaging in serial transfer of address information with the serial bus through a serial port, and for engaging in parallel transfer of address information through a parallel port; and
- an address parallel register for staging address information between the parallel port of the address shift register and the group parallel address bus;

and the data register comprises:
- a data shift register for engaging in serial transfer of data with the serial bus through a serial port, and for engaging in parallel transfer of data through a parallel port; and
- a data parallel register for staging data between the parallel port of the data shift register and the group parallel data bus.

11. An I/O system as in claim 10 wherein the serial bus is a bit-serial bus.

12. An I/O system as in claim 10 further comprising a first swap bus connecting an output port of the data shift register to an input port of the data parallel register, and a second swap bus connecting an output port of the data parallel register to an input port of the data shift register, for swapping data between the data shift register and the data parallel register.

13. An I/O system as in claim 10 wherein the router I/O channel group further comprises a respective byte-valid bus, and wherein the data register in each of the router I/O channels further comprises;
- a byte-valid shift register for indicating validity of particular data bytes in the data shift register, the byte-valid shift register having a parallel port; and
- a byte-valid parallel register for staging byte-valid information between the parallel port of the byte-valid shift register and the group byte-valid bus.

14. An I/O system as in claim 13 wherein the data shift register comprises a plurality of shift registers having respective shift-I/O ports, and wherein the data register further comprises:
- a byte counter for receiving little-endian and big-endian byte-ordering instructions from the serial bus; and
- a decoder array for controllably sequentially coupling the shift-I/O ports to the serial bus to achieve byte transfers in accordance with the little-endian and big-endian byte-ordering instructions, and for setting respective byte-valid flags in the byte-valid shift register in accordance with the byte transfers.

15. An I/O system as in claim 9 wherein each of the router I/O channels acquires a self-parity based on the respective address thereof, and wherein each of the router I/O channels further comprises parity logic for receiving a parity bit from the channel bus and comparing the parity bit to the router I/O channel self-parity.

16. An I/O system as in claim 9 wherein the channel bus is a serial bus, wherein each of the router I/O channels further comprises a pipeline register disposed in the serial bus between the respective router I/O channel source port and the address and data registers.

17. An I/O system as in claim 9 wherein the network is integral to a multi-stage interconnection network for synchronously establishing bidirectional routing paths from the subset of active PEs to target PEs through a plurality of switching stages, and for accommodating synchronous data transfer on the established bidirectional routing paths.

18. An I/O system as in claim 17 wherein the network comprises a first stage which includes the network source ports, and a second stage which includes the network target ports.

19. A scalable bandwidth I/O system for transferring a plurality of data items between an I/O domain comprising at least one I/O device and an array of processor elements ("PEs") in a massively parallel processor, comprising:
- an interconnection network having a plurality of source ports coupled to the PEs and a plurality of target ports, for synchronously establishing bidirectional routing paths from the network source ports to the network target ports in accordance with routing information from an active subset of the PEs, and for accommodating synchronous data transfer on the established bidirectional routing paths between the network source ports and the network target ports; p1 a buffer memory for supporting an I/O data transfer between the buffer and the I/O domain, the buffer having a plurality of banks; and a plurality of router I/O channels arranged in groups, each of the router I/O channel groups having a plurality of source ports respectively coupled to a subset of the network target ports so as to be targetable by the subset of active PEs, and a respective group address bus-data bus pair coupled to a respective one of the banks of the buffer, wherein each of the router I/O channels comprises:
 a channel bus coupled to a respective one of the router I/O channel source ports;
 an address register for receiving address information from the channel bus and furnishing the address information to the respective group address bus; and
 a data register for receiving output data from the channel bus and furnishing the output data to the respective group data bus, and for receiving input data from the respective group data bus and furnishing the input data to the channel bus.

20. A scalable bandwidth I/O system as in claim 19 wherein the buffer memory comprises a plurality of memory banks grouped into bank pairs, each of the memory banks being connected to the address ports and the data ports of a respective two of the router I/O channel groups having a common address personality, and wherein within each bank pair,
 the source ports of two of the router i/O channel groups respectively connected to the bank pair are connected to a first subset of the network target ports, the two router I/O channel groups connected to the first subset of the network target ports having different address personalities; and
 the source ports of another two of the router I/O channel groups respectively connected to the bank pair are connected to a second subset of the target router ports, the two router I/O channel groups connected to the second subset of the network target ports having different address personalities;
and wherein the routing information includes personality selection information, for reducing router contention by a factor of two.

21. A scalable bandwidth I/O system for transferring a plurality of data items between an I/O domain comprising at least one I/O device and an array of processor elements ("PEs") in a massively parallel processor, comprising:
 a multi-stage interconnection network having a plurality of source ports coupled to the PEs and a plurality of target ports, for synchronously establishing bidirectional routing paths from the network source ports to the network target ports in accordance with an active subset of the PEs through a plurality of switching stages, and for accommodating synchronous data transfer on the established bidirectional routing paths, the switching stage having the network target ports comprising a plurality of similar router integrated circuits which include respective subsets of the network target ports;
 a buffer memory for supporting an I/O data stream between the buffer and the I/O domain, the buffer being organized into memory banks; and
 a router I/O stage comprising a plurality of router I/O printed circuit boards, each of the router I/O printed circuit boards comprising a plurality of similar router I/O integrated circuits, and each of the router I/O integrated circuits having a parallel address bus and a parallel data bus coupled to a respective memory bank of the buffer memory, and further having a plurality of router ports for engaging in the transfer of serial address information and data with the network target ports, wherein connections between the router ports of each of the router I/O integrated circuits and the network target ports are distributed among the router integrated circuits, and wherein each of the router ports of the router I/O integrated circuits has a unique address based on the number of router ports in each of the router I/O integrated circuits, the number of router I/O integrated circuits on each of the router I/O printed circuit boards, and the number of the router I/O printed circuit boards in the massively parallel processor.

22. An I/O system as in claim 21 wherein the number of router ports in each of the router I/O integrated circuits is 64, the number of router I/O integrated circuits on each of the router I/O printed circuit boards is 4.

* * * * *